US008439085B2

(12) United States Patent
Liebson et al.

(10) Patent No.: US 8,439,085 B2
(45) Date of Patent: *May 14, 2013

(54) SEMI-RIGID FLEXIBLE DUCT

(75) Inventors: Steven Liebson, Ein Sarid (IL); Graeme Liebson, Ein Sarid (IL); Robert Cohen, Ein Sarid (IL)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 736 days.

This patent is subject to a terminal disclaimer.

(21) Appl. No.: 12/645,517

(22) Filed: Dec. 23, 2009

(65) Prior Publication Data
US 2010/0154914 A1   Jun. 24, 2010

Related U.S. Application Data

(63) Continuation-in-part of application No. 11/717,411, filed on Mar. 13, 2007, now abandoned, which is a continuation-in-part of application No. 11/389,623, filed on Mar. 24, 2006, now abandoned.

(51) Int. Cl.
*F16L 11/00* (2006.01)
(52) U.S. Cl.
USPC ........... 138/133; 138/125; 138/127; 138/131; 138/134; 138/149; 428/36.91
(58) Field of Classification Search .................. 138/125, 138/127, 131, 133, 134, 149; 428/36.91
See application file for complete search history.

(56) References Cited

U.S. PATENT DOCUMENTS

| | | | |
|---|---|---|---|
| 2,858,854 A * | 11/1958 | Daggett | 138/124 |
| 3,554,237 A | 1/1971 | Pelley et al. | |
| 3,861,022 A | 1/1975 | Hildebrandt et al. | |
| 3,945,867 A | 3/1976 | Heller et al. | |
| 4,489,759 A | 12/1984 | Yamamura | |
| 4,521,368 A | 6/1985 | Mercer et al. | |
| 4,570,679 A | 2/1986 | Schippl | |
| 4,875,298 A * | 10/1989 | Wright | 34/86 |
| 5,042,172 A | 8/1991 | Foco et al. | |
| 5,062,219 A | 11/1991 | Harris et al. | |
| 5,085,251 A | 2/1992 | Popelka et al. | |
| 5,121,948 A | 6/1992 | Anderson et al. | |
| 5,133,579 A | 7/1992 | Anderson et al. | |
| 5,145,217 A | 9/1992 | Anderson et al. | |
| 5,182,147 A | 1/1993 | Davis | |
| 5,281,187 A | 1/1994 | Whitney | |
| 5,526,849 A | 6/1996 | Gray | |

(Continued)

*Primary Examiner* — James Hook
(74) *Attorney, Agent, or Firm* — Edward Langer Adv. and Patent Attorney

(57) ABSTRACT

A semi-rigid, flexible duct including a pair of coaxial sleeves, namely an inner sleeve and an outer sleeve disposed parallel to and about the inner sleeve and a resilient wound element disposed between the sleeves. Each of the inner sleeve and the outer sleeve constitutes an aluminum foil ribbon. The wound element imparts corrugations to the two sleeves, such that the duct is extendible between a compacted configuration suitable for storage and for shipping and an extended configuration suitable for installation in a gas transport arrangement. Both the inner sleeve and the outer sleeve are of a predetermined thickness rendering the duct substantially rigid when in an extended configuration and enabling the duct to maintain its substantial rigidity upon extension from a compacted configuration. Optionally, at least one of the sleeves further includes a second, plastic layer bonded to the aluminum foil ribbon layer.

44 Claims, 17 Drawing Sheets

U.S. PATENT DOCUMENTS

| | | |
|---|---|---|
| 6,000,435 A | 12/1999 | Patel et al. |
| 6,003,561 A | 12/1999 | Brindza et al. |
| 6,186,181 B1 | 2/2001 | Schippl |
| 6,732,765 B2 | 5/2004 | Schippl et al. |
| 2003/0178080 A1 | 9/2003 | Schippl et al. |
| 2004/0040609 A1* | 3/2004 | Oishi et al. .................. 138/141 |
| 2006/0051547 A1* | 3/2006 | Lim et al. .................. 428/36.91 |
| 2007/0220732 A1* | 9/2007 | Liebson ........................ 29/458 |
| 2007/0235101 A1* | 10/2007 | Liebson et al. ............... 138/131 |
| 2010/0139801 A1* | 6/2010 | Liebson et al. ............... 138/134 |

* cited by examiner

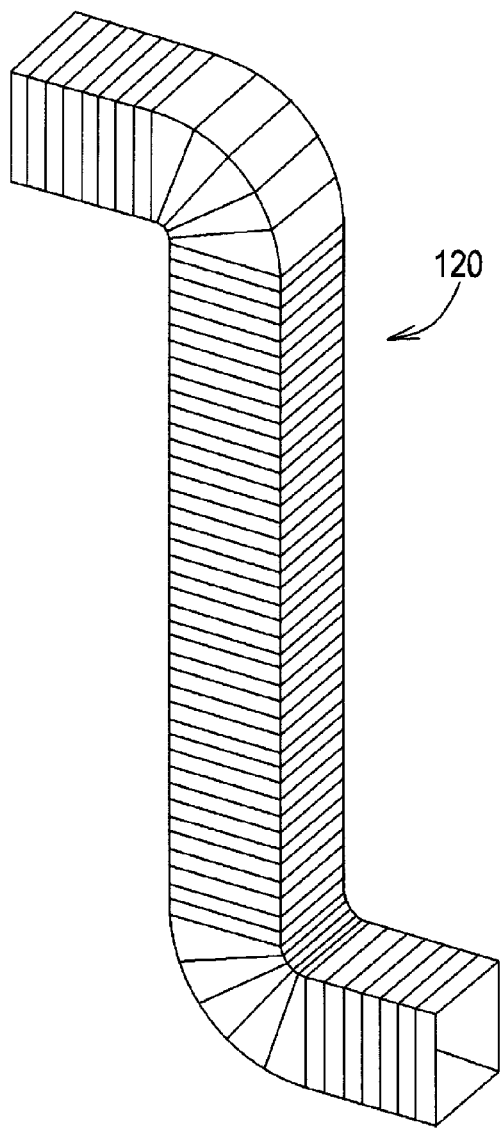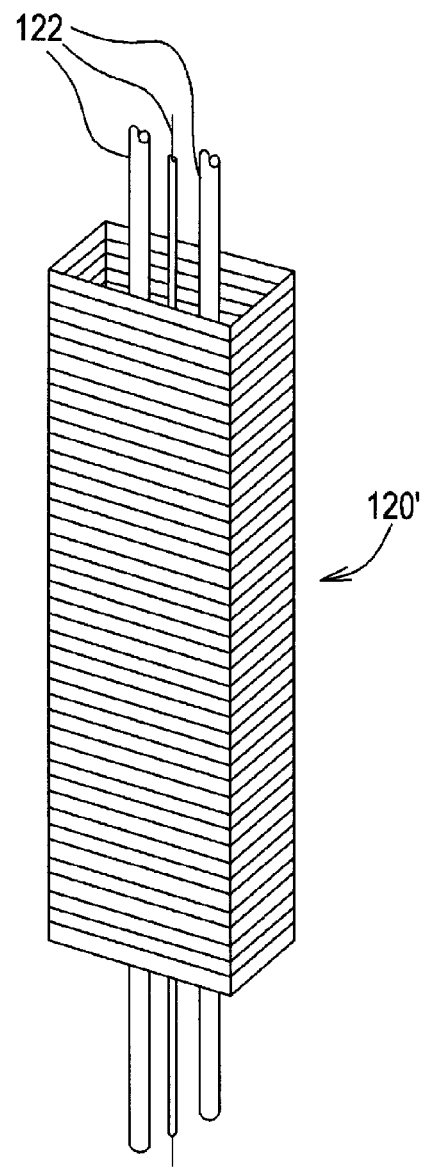
FIG. 21A  FIG. 21B

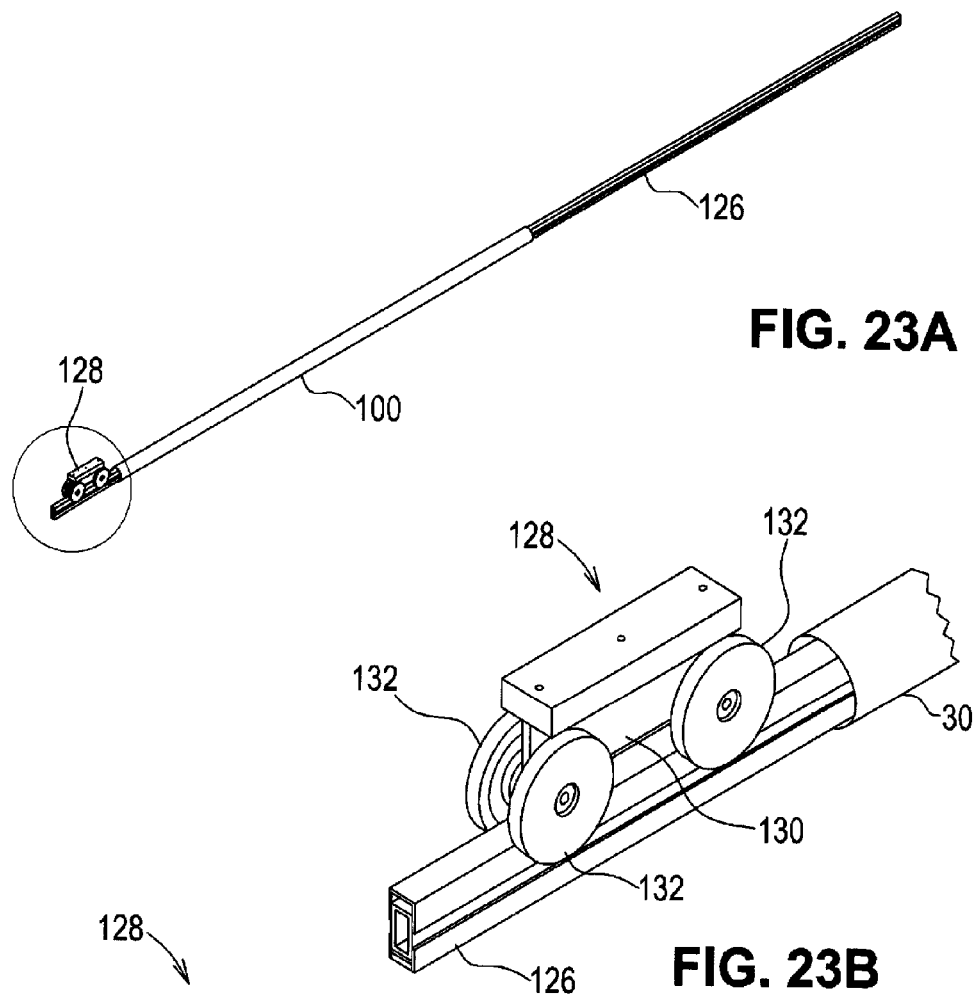
FIG. 23A
FIG. 23B
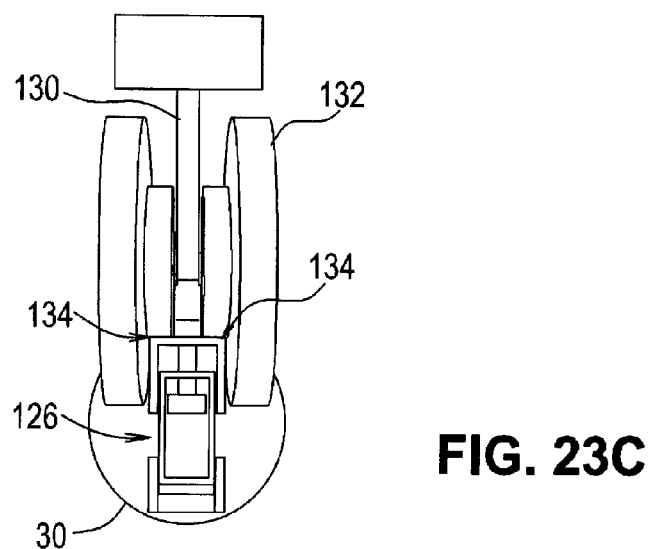
FIG. 23C

SEMI-RIGID FLEXIBLE DUCT

REFERENCE TO APPLICATION

The present application is a continuation-in-part of U.S. patent application Ser. No. 11/717,411 entitled "Semi-Rigid Flexible Duct", filed Mar. 13, 2007 now abandoned, which is a continuation-in-part of U.S. patent application Ser. No. 11/389,623, entitled "Flexible Semi-Rigid Clothes Dryer Duct", filed Mar. 24, 2006 now abandoned, the contents of which are incorporated herein by reference.

FIELD OF THE INVENTION

The present invention relates to ducts, particularly semi-rigid flexible ducts.

BACKGROUND OF THE INVENTION

Ducts are used for different purposes, including for the conveyance of air, such as in ventilation, heating and cooling systems, or for conveying away exhaust gas from clothes dryers or other similar machines, as well as for carrying electrical cables and wiring, or other utilities.

When used for air conditioning or ventilation systems, such as within suspended ceilings, particularly in industrial and office premises, the ducts are circular and must be supported, as they have little self-support.

A further, very well known use of ducts is an exhaust vent for clothes dryers, in which the duct is fabricated of a resilient wire helix covered with vinyl or aluminum tubing. Both type of ducts lack structural integrity, while the vinyl-covered duct is not flame resistant. The lack of structural integrity of these ducts typically results in sagging and crinking thereof, causing the duct, over time, to become lined with lint from the clothes dried in the dryer, posing a fire hazard. In the United States alone, thousands of fires associated with clothes dryers occur, causing deaths and injuries and millions of dollars in damages. It is generally recommended by clothes dryer manufacturers not to use vinyl ducts such as these for dryer exhaust transition ducts.

Representative of the prior art in ventilation systems is U.S. Pat. No. 5,281,187 to Whitney, for a "Unitary Vent and Duct Assembly" which discloses a "semi-rigid flexible duct" for a ventilation system installed with a suspended ceiling structure. The duct taught in this patent is actually a solid aluminum tube which is corrugated or "accordion-folded" so that it can be compressed or compacted for storage or shipping. The corrugated aluminum tube duct taught therein, is meant to be coupled to a duct assembly of which it is an integral part, which is intended only for installation within a framed section of a suspended or dropped ceiling. However, once such a tube has been compressed and then re-extended for installation, it is unlikely to maintain its rigidity, depending on the thickness of the aluminum. A tube of this type maintains its rigidity by virtue of its being fabricated of solid metal, is heavy and expensive and can be unwieldy to install. The corrugated aluminum, when extended after compression, has significant ridges and other obtrusive topographical features along its interior due to the corrugations, which cause frictional resistance to the air flow within, a further disadvantage.

Corrugated aluminum is also employed for the exhaust vent of clothes dryers, as, for example, in U.S. Pat. Nos. 5,121,948, 5,133,579, and 5,145,217, which solve the above-described problem of insufficient rigidity, but by using totally rigid segments. Even though the aluminum tubing itself is clearly fire resistant, the ridges and other internal topographical features similar to those mentioned hereinabove with respect to the Whitney patent, also cause frictional resistance to the air flow within, permitting accumulation of lint, which, as stated hereinabove, presents a fire hazard.

U.S. Pat. No. 5,526,849, included herein by reference, to Gray for a "Flexible Duct" discloses a duct and a method for manufacture thereof. The duct disclosed therein is formed of plastic tapes wound on a rotating mandrel with a wire resilient helix and a yarn helix therebetween. The duct so produced, while flame resistant, has rigidity limited to that provided by the wire helix. The additional yarn helix complicates the manufacturing process and adds to the internal topographical features of the duct, increasing friction and the possibility of lint accumulation therein, as described above.

The shape of ducts also has significance. Relatively heavy, rectangular metal ducts, formed of heavy gauge sheet metal, are often used for heating and cooling systems in industrial and office premises. A rectangular cross-sectional shape is desired due to the possibility of placing the duct against a support surface, and thereby utilizing available space more efficiently than a circular duct. These ducts are limited, however, in length, due to their relatively heavy weight and rigidity, as well as to transportation considerations. Accordingly, several lengths of these ducts may need to be joined together on site in order to provide adequate lengths of duct. It will be appreciated that they also require sufficiently strong hangers and other mechanical supports to be provided so as to provide adequate support. Furthermore, specially made corner portions must be provided to take account of bends.

A further consideration that must be taken into account when installing exhaust ducts for directing exhaust gases from machines, is the fact that the exhaust vents (or in the case of air conditioning units, the cool air supply vents) often have a square or rectangular shape, requiring somewhat unorthodox adaptive connections to conventional round ducts.

During manufacturing of conventional round ducts, a problem has been encountered with wrapping of semi-rigid materials, such as thin aluminum sheet, about a rotating mandrel. While the semi-rigid materials provide flexibility to the resulting duct produced in this fashion, the manufacturing process is complicated due to the fact that semi-rigid materials may tear under the tension applied during the wrapping procedure. The solution to this problem, until now, has been to avoid the use of thin aluminum sheets in constructing semi-rigid ducts, and to rely on heavier, more rigid materials, which do not lend themselves to flexibility, and are unwieldy to install, as mentioned above in relation to U.S. Pat. No. 5,281,187 to Whitney.

Therefore, it would be desirable to overcome the above-mentioned disadvantages associated with the prior art of semi-rigid flexible ducts.

SUMMARY OF THE INVENTION

The present invention seeks to provide a semi-rigid, multi-purpose flexible duct that is fire resistant and that is lighter in weight and less expensive than those used in the prior art, while maintaining rigidity and structural integrity, even after having been compressed to a compacted configuration for shipping and storage and then re-extended for installation. Further, the duct has minimal internal topographical features or structure, even when re-extended after having been compressed to a compacted configuration for shipping and storage.

A further aim of the present invention is to provide a semi-rigid, multi-purpose flexible duct having a cross-sectional configuration which may be round, square or rectangular according to need, and which may be used for such diverse uses as gas transport, for example in air conditioning systems or as a gas dryer duct; and the enclosure of utility pipes and cables in an isolated and low-fire-hazard environment.

The present invention further seeks to provide a method for manufacturing such a duct that is simple, fast, and efficient.

In a preferred embodiment there is provided a duct, which includes a pair of coaxial sleeves including an inner sleeve and an outer sleeve, each constituting a thin aluminum sheet used as the construction material for the duct, provided as an aluminum foil ribbon with sufficient thickness to provide flexibility and withstand the tension developed during the wrapping procedure about a rotating mandrel.

There is thus provided, a semi-rigid, flexible duct, which, in accordance with the present invention, may be used for gas transport, such as in cooling or heating systems or for machine exhausts, including but not limited to clothes dryers. It may further be used for enclosing utility lines, such as water, gas, electricity, and telecommunications, particularly when the duct is employed in its rectangular configuration. The duct of the present invention, when formed so as to have a rectangular cross-section, may easily be disposed between two leaves of a hollow wall construction, beneath a suspended wooden or other floor, and within a suspended ceiling, so as to provide an efficient, lightweight yet secure, and easily installable manner of passing utility lines behind, beneath or below building elements.

In a preferred embodiment there is provided a semi-rigid duct, comprising a pair of aluminum foil ribbons wrapped to form a pair of coaxial sleeves, having an inner sleeve and an outer sleeve disposed parallel to and about the inner sleeve, and a resilient helical element disposed between them;

wherein each of the inner sleeve and the outer sleeve have metallic properties;

wherein the helical element imparts helical corrugations to the inner sleeve and the outer sleeve, such that the duct is axially extendible between a compacted configuration suitable for storage and for shipping and an extended configuration; and wherein the inner sleeve and the outer sleeve are of a predetermined thickness rendering the duct substantially rigid when in the extended configuration, and enabling the duct to maintain its substantial rigidity upon extension from the compacted configuration.

An advantage of the above-mentioned embodiment of the present invention is that due to its rigidity and structural integrity, there is a reduction in the tendency of the duct to accumulate lint, thereby reducing fire hazards.

A further advantage of the above-mentioned embodiment of the invention is that unlike the prior art flexible ducts, such as mentioned in U.S. Pat. No. 5,526,849 (see Background), the elimination of a plastic layer from the duct construction further reduces fire hazards.

In the preferred embodiment, the thickness of the inner sleeve and of the outer sleeve is in the range of 24 to 35 microns.

In a preferred method of manufacturing a semi-rigid flexible duct, the method comprises the steps of
a) providing a mandrel of preselected diameter for fabricating a duct therearound;
b) providing a first continuous aluminum ribbon of predetermined thickness to form a first continuous tape;
c) providing a second continuous aluminum ribbon of predetermined thickness to form a second continuous tape;
d) wrapping the first continuous tape with a predetermined overlap around the mandrel to form an inner sleeve;
e) winding a wire around the inner sleeve; and
f) wrapping the second continuous tape with a predetermined overlap around the inner sleeve and the wire winding to form an outer sleeve disposed parallel to and about the inner sleeve, thereby to form a duct.

In another preferred embodiment there is provided a duct which incorporates the use of plastic layers, and includes a pair of coaxial sleeves, including an inner sleeve and an outer sleeve disposed parallel to and about the inner sleeve, and a resilient helical element disposed between them;

wherein each of the inner sleeve and the outer sleeve includes a first layer having metallic properties and one or both of which further include a second, plastic layer bonded to the first layer having metallic properties;

wherein the helical element imparts helical corrugations to the inner sleeve and the outer sleeve, such that the duct is axially extendible between a compacted configuration suitable for storage and for shipping and an extended configuration;

and wherein all the layers of both the inner sleeve and the outer sleeve are of a thickness predetermined to together render the duct substantially rigid when in the extended configuration and to together enable the duct to maintain its substantial rigidity upon extension from the compacted configuration.

When a predetermined length of the duct is in the extended configuration and is disposed horizontally and supported at a first end thereof, the duct is fabricated to bend under the influence of gravitational force such that a second unsupported end thereof is lower than the first supported end by no more than a predetermined percentage of the predetermined length. Further, when a predetermined length of the duct is in the extended configuration and is disposed horizontally and supported at both ends thereof, the duct is fabricated to bend under the influence of gravitational force such that the central portion thereof is also lower than the level of the supported ends by no more than a predetermined percentage of the predetermined length, which, for a 2 meter length of a duct with a diameter of approximately 10 centimeters, will be less than 1 centimeter for an extended duct that was not compacted and less than 5 centimeters for a duct that was extended from the compacted configuration. Additionally, when the duct is in the extended configuration after having been compressed to the compacted configuration, the inward-facing surface of the first layer having metallic properties of the inner sleeve is substantially smooth and featureless except for the helical corrugations.

Further, both the inner sleeve and the outer sleeve include a first layer having metallic properties and a second, plastic layer, forming thereby, respectively, an inner two-layer laminate and an outer two-layer laminate, which are fabricated of fire-resistant and puncture-resistant materials. In all of the two-layer laminates, the layers are bonded together with a fire-retardant adhesive and the inner two-layer laminate is also bonded to the outer two-layer laminate with a fire-retardant adhesive.

Additionally, the first layers having metallic properties of the inner two-layer laminate and the outer two-layer laminate are fabricated of aluminum ribbon of predetermined thicknesses and the second, plastic layers of the inner two-layer laminate and the outer two-layer laminate are fabricated of polyester ribbon of predetermined thicknesses, respectively bonded together to form thereby, respectively, an inner two-layer laminated tape of predetermined thickness and an outer two-layer laminated tape of predetermined thickness, and wherein the inner two-layer laminate is an inner helical wrapping with a predetermined overlap of the inner two-layer laminated tape and the outer two-layer laminate is an outer helical wrapping with a predetermined overlap of the outer two-layer laminated tape.

Further, in the inner sleeve, the second plastic layer is disposed parallel to and about the first layer having metallic properties and in the outer sleeve, the first layer having metallic properties is disposed parallel to and about the second plastic layer. The first layer having metallic properties of the inner two-layer laminate is fabricated of aluminum ribbon of a thickness in the range 6 to 12 microns, and the first layer having metallic properties of the outer two-layer laminate is fabricated of aluminum ribbon of a thickness in the range 24 to 35 microns. The second plastic layers of both the outer and inner two-layer laminates are fabricated of polyester ribbon of a thickness in the range 10 to 14 microns.

Additionally, the resilient helical element is fabricated of a metal having spring-like resilience, such as, a wound galvanized wire of a diameter in the range 0.9 to 1.3 millimeters.

Further, in accordance with a preferred embodiment of the invention, the resilient helical element is aligned with the inner wound wrapping so that the wound galvanized wire is approximately centered over the overlap of the inner helical wrapping of the inner two-layer laminated tape and the outer helical wrapping of the outer two-layer laminated tape is aligned with the resilient helical element so that the overlap of the outer helical wrapping of the outer two-layer laminated tape is approximately centered over the spaces between the wires of the wound galvanized wire of the resilient helical element.

In accordance with a further embodiment of the invention, the duct also includes an insulating sheath fabricated of fiberglass, disposed parallel to and about the outer sleeve, and an enclosing jacket disposed parallel thereto and thereabout. The enclosing jacket is a multi-layer jacket including a tubular, plastic inner wrapping and a two-layer laminate outer wrapping, including a plastic inner layer and an outer layer having metallic properties, bonded together with a fire-retardant adhesive, disposed parallel and about the tubular, plastic inner wrapping and bonded thereto with a fire-retardant adhesive. The plastic inner wrapping is fabricated of polyester ribbon of predetermined thickness, and the plastic inner layer of the two-layer laminate outer wrapping is fabricated of polyester ribbon of predetermined thickness and the outer layer having metallic properties of the two-layer laminate outer wrapping is fabricated of aluminum ribbon of predetermined thickness. The insulating sheath is fabricated of fiberglass of a thickness in the range 25 to 60 millimeters. The plastic inner wrapping is fabricated of polyester ribbon of a thickness in the range 10 to 14 microns. The plastic inner layer of the two-layer laminate outer wrapping is fabricated of polyester ribbon of a thickness in the range 10 to 14 microns, and the outer layer having metallic properties of the two-layer laminate outer wrapping is fabricated of aluminum ribbon of a thickness in the range 6 to 9 microns.

The duct may serve as a gas transport duct or as a duct for enclosing utility supply lines, and has a cross-sectional configuration which may be circular or polygonal, such as square or rectangular.

There is further provided, in accordance with the present invention, a method for manufacturing a semi-rigid, flexible duct which includes the steps of a) providing a mandrel of preselected diameter for fabricating a duct therearound;

b) combining a first aluminum continuous ribbon of predetermined thickness with a first polyester continuous ribbon of predetermined thickness to form a first two-layer laminated continuous tape;

c) combining a second aluminum continuous ribbon of predetermined thickness with a second polyester continuous ribbon of predetermined thickness to form a second two-layer laminated continuous tape;

d) wrapping the first two-layer laminated continuous tape with a predetermined overlap around the mandrel with the first aluminum ribbon facing inward toward the mandrel and the first polyester ribbon facing outward with respect to the mandrel to form an inner two-layer sleeve;

e) winding a wire around the inner two-layer sleeve; and f) wrapping the second two-layer laminated continuous tape with a predetermined overlap around the inner two-layer sleeve and the galvanized wire winding with the second polyester ribbon facing inward toward the mandrel and the second aluminum ribbon facing outward with respect to the mandrel to form an outer two-layer sleeve disposed parallel to and about the inner two-layer sleeve, thereby to form a duct.

Additionally, the step b) of combining a first aluminum ribbon includes the sub-step of applying a fire-retardant adhesive between the first aluminum ribbon and the first polyester ribbon to bond them together; and the step c) of combining a second aluminum ribbon includes the sub-step of applying a fire-retardant adhesive between the second aluminum ribbon and the second polyester ribbon to bond them together. Further, the step of b) combining a first aluminum ribbon further includes the sub-step of coating the polyester face of the first two-layer laminated continuous tape with a fire-retardant adhesive; the step c) of combining a second aluminum ribbon further includes the sub-step of coating the polyester face of the second two-layer laminated continuous tape with a fire-retardant adhesive; and in the step d) of wrapping the second two-layer laminated continuous tape, the outer two-layer sleeve is bonded to the inner two-layer sleeve with the galvanized wire winding therebetween.

Additionally in accordance with the method of the present invention, the step e) of winding a wire includes the sub-step of aligning the wound wire with the overlap of the first two-layer laminated continuous tape so that the wound wire is approximately centered over the overlap of the first two-layer laminated continuous tape, and the step f) of wrapping the second two-layer laminated continuous tape includes the sub-step of aligning the second two-layer laminated continuous tape so that the overlap thereof is approximately centered over the spaces between the windings of wire.

Further in accordance with the method of the present invention, the steps d), e), and f) of wrapping the first two-layer laminated continuous tape, winding the galvanized wire, and wrapping the second two-layer laminated continuous tape are performed by rotating the mandrel as the first two-layer laminated continuous tape, the galvanized wire, and the second two-layer laminated continuous tape are respectively deposited thereupon; and the steps d), e), and f) of wrapping the first two-layer laminated continuous tape, winding the galvanized wire, and wrapping the second two-layer laminated continuous tape are performed continuously and simultaneously with predetermined phase differences, with respect to the rotation of the mandrel, therebetween. Namely, the steps d) and e) of wrapping the first two-layer laminated continuous tape and winding the galvanized wire are performed continuously and simultaneously with a phase difference of 360 degrees, with respect to the rotation of the mandrel, therebetween; and the steps e) and f) of winding the galvanized wire and wrapping the second two-layer laminated continuous tape are performed continuously and simultaneously with a phase difference of 120 degrees, with respect to the rotation of the mandrel, therebetween.

In accordance with an additional embodiment of the present invention, the method further includes, after the step f) of wrapping the second two-layer laminated continuous tape, the steps of:

g) sheathing the outer two-layer sleeve with a fiberglass insulating sheath of a thickness in the range 25 to 60 millimeters, disposed parallel thereto and thereabout; and h) enveloping the insulating sheath with an enclosing jacket. Additionally, the step h) of enveloping includes the following sub-steps:

1) providing a mandrel of preselected diameter for fabricating the enclosing jacket therearound;

2) combining a polyester continuous ribbon of predetermined thickness with an aluminum continuous ribbon of predetermined thickness to form a two-layer laminated continuous tape;

3) wrapping a polyester continuous ribbon of predetermined thickness around the mandrel to form an inner plastic sleeve; and 3) wrapping a polyester continuous ribbon of predetermined thickness around the mandrel to form an inner plastic sleeve; and 4) wrapping the two-layer laminated continuous tape around the inner plastic sleeve with the polyester ribbon facing inward toward the mandrel and the aluminum ribbon facing outward with respect to the mandrel to form an outer two-layer sleeve disposed parallel to and about the inner plastic sleeve.

The sub-step 2) of combining includes the sub-sub-step of applying a fire-retardant adhesive between the polyester ribbon and the aluminum ribbon to bond them together, and the sub-step 3) of wrapping a polyester ribbon includes the sub-sub-step of coating the outer face of the inner plastic sleeve with a fire-retardant adhesive to bond it to the two-layer laminated tape.

Additionally, the sub-steps 3) and 4) of wrapping a polyester ribbon and wrapping the two-layer laminated tape are performed by rotating the mandrel as the polyester ribbon and the two-layer laminated tape are respectively deposited thereupon. Further, the sub-steps 3) and 4) of wrapping a polyester ribbon and wrapping the two-layer laminated tape are performed continuously and simultaneously with a predetermined phase difference, namely, of 360 degrees, with respect to the rotation of the mandrel, therebetween.

In accordance with a preferred embodiment of the present invention, the method further includes in step f) of winding, the additional step of imparting to at least a portion of the duct, a polygonal cross-sectional configuration, such as square or rectangular.

Thus, the present invention advantageously provides a semi-rigid, multi-purpose flexible duct that is fire resistant and that is lighter in weight and less expensive than those used in the prior art.

Further advantages of the invention will become apparent from the following drawings and description.

BRIEF DESCRIPTION OF THE DRAWINGS

The present invention will be more fully understood and appreciated from the following detailed description, taken in conjunction with the drawings, in which:

FIG. 21A is a pictorial representation of a square section gas transport duct;

FIG. 21B is a pictorial representation of a rectangular section utility line duct;

FIG. 23A is a schematic diagram of apparatus for imparting a selected polygonal cross-sectional configuration to a circular duct;

FIG. 23B is an enlarged schematic representation of the apparatus identified as B in FIG. 23A; and FIG. 23C is an end view of the apparatus illustrated in FIG. 23B.

DETAILED DESCRIPTION OF THE INVENTION

Figure 1:
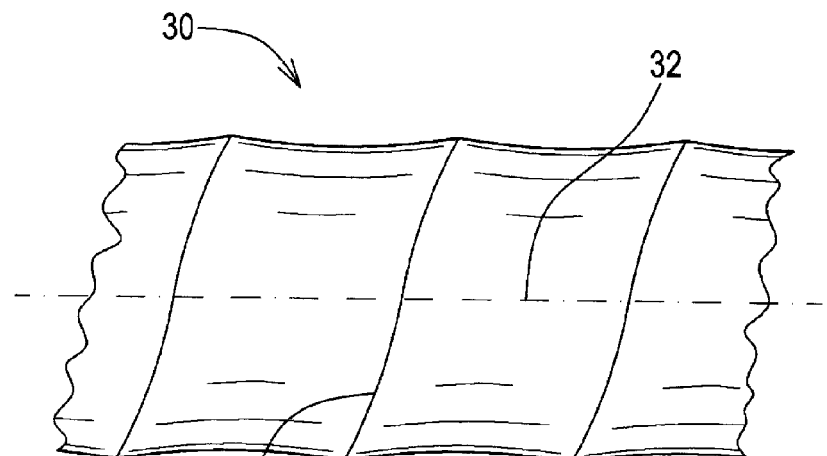
FIG. 1 is a side view of a portion of a duct having a circular cross-sectional configuration, constructed and operative in accordance with the embodiments of the present invention.
Figure 2:
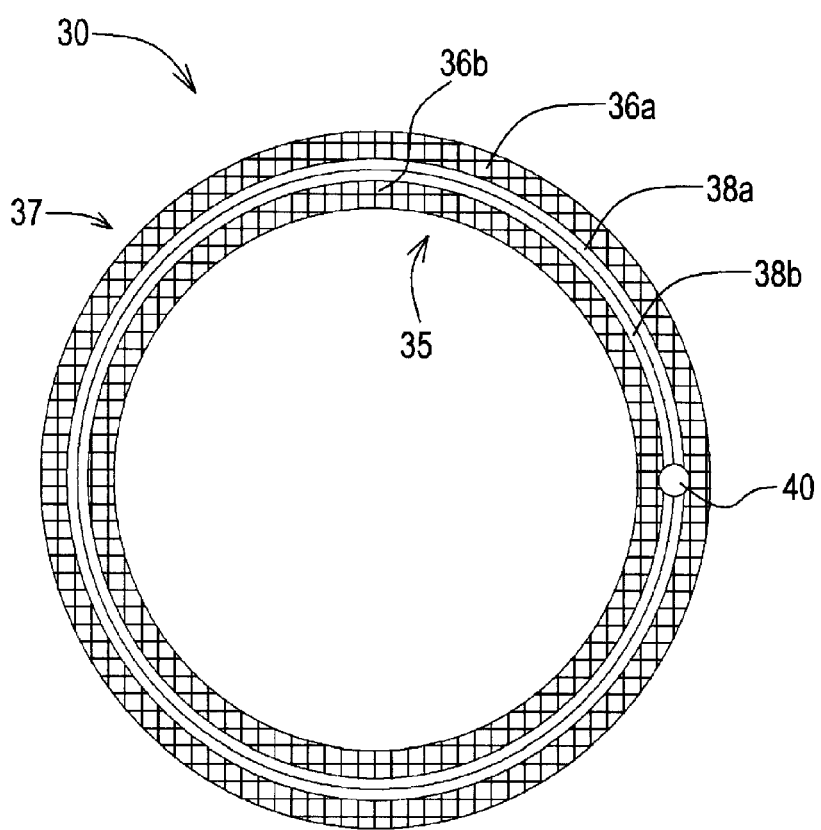
FIG. 2 shows a cross sectional view of a portion of a duct constructed and operated in accordance with a first embodiment of the present invention.

Referring now to the drawings, there are shown, in FIG. 1, a side view of a segment of a duct, referred to generally as 30, constructed and operative in accordance with the embodiments of the present invention, and a schematic axial cross-sectional view of a first embodiment thereof in FIG. 2. As shown in the cross-sectional view of FIG. 2, duct 30 is of a two-layer cylindrical construction having an axis 32 and corrugations 34, and may be used for gas transport or for enclosing utility lines.

In accordance with the present invention, the specific description below of cylindrical duct 30 applies equally to non-cylindrical ducts, such as non-insulated square duct 100 (FIGS. 19A-19B) and insulated square duct 110 (FIGS. 20A-20B), as well as variations thereof, all as described hereinbelow.

By way of clarification, the term "helical," and variations thereof, derives from the description of the manufacture of the ducts of the invention, and relates to the act of winding various elements in a spiral or helix. In the embodiments of the invention in which the duct remains cylindrical, the helical windings clearly remain helical. In those polygonal embodiments of the invention however, the windings, while not being strictly helical, retain a general square-helical arrangement, and may be referred to as such, although mainly they are referred to merely as "windings" or "wound."

Referring now to FIG. 2, duct 30 has inner and outer sleeves, referenced 35 and 37, respectively, which are coaxial, each preferably being formed of a wound helical wrapping of a single-layer aluminum ribbon provided as a tape, 36a and 36b, bonded together with adhesive layers 38a and 38b, each layer of adhesive on a ribbon layer, respectively. Coaxially wound around inner sleeve 35 is a wound helical wire 40, preferably galvanized wire, disposed between inner sleeve 35 and outer sleeve 37 encapsulated between two layers of adhesive, 38a, 38b, thereby bonding layers 35 and 37 to helical wire 40 and to each other. Aluminum ribbon 36b is helically wound around a mandrel 42 (see FIG. 3, discussed hereinbelow), to form inner sleeve 35.

Figure 3:
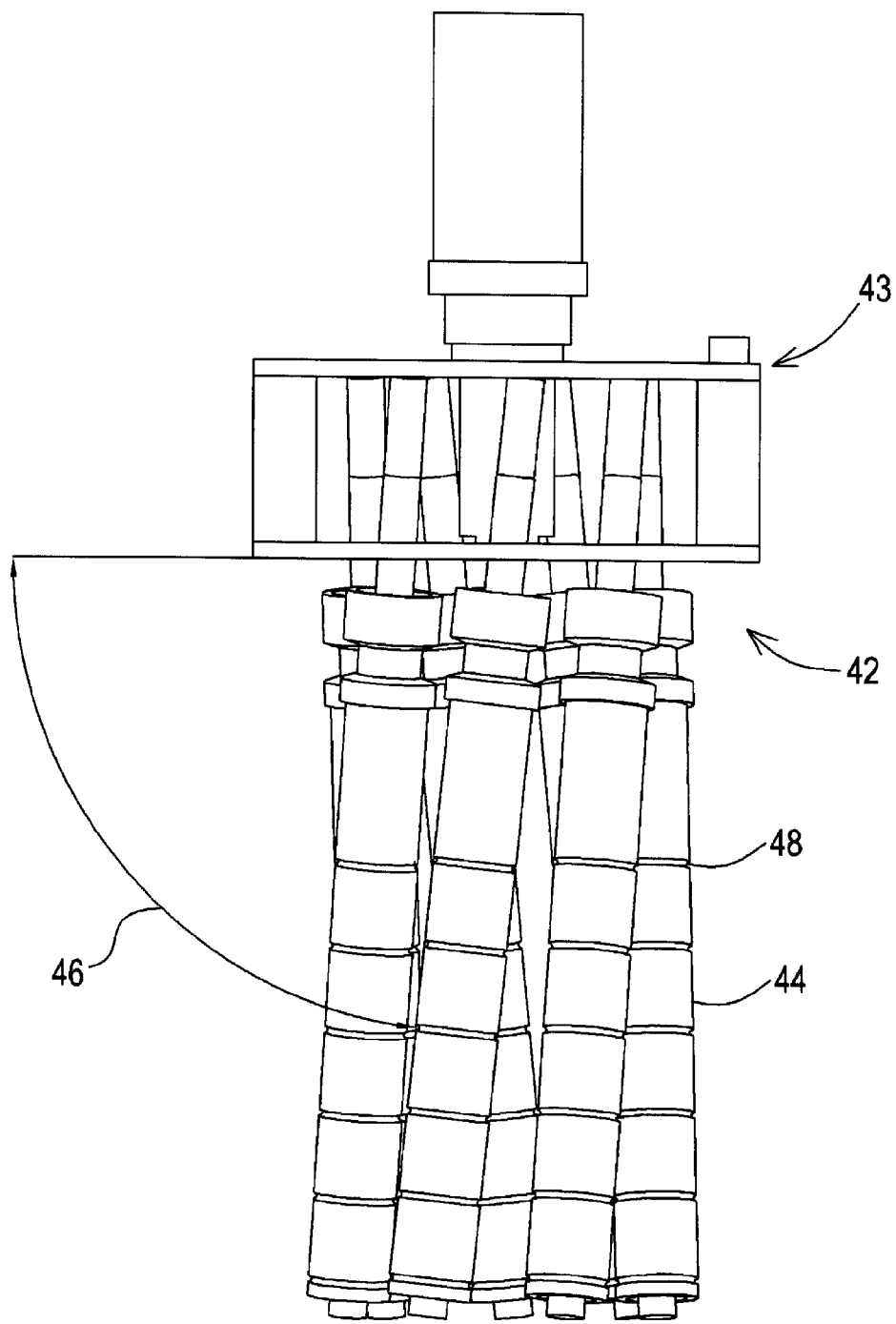
FIG. 3 shows a top view of a mandrel construction used in manufacturing the duct of FIG. 1.

Referring now to FIG. 3, the construction of mandrel 42 is shown, comprising a plurality of rollers 44. Rollers 44 are all individually rotatable, and each is mounted on a fixed plate 43 at an angle 46 with respect to the plate 43. Each individual roller 44 has formed therein a set of grooves 48 for accepting the wire 40 (FIG. 1) which forms the basis for the spiral format of the flexible duct 30. These grooves 48 are precision-shaped and are precision-spaced apart in order to accept the predetermined flow of wire 40, and this flow is established by the angle 46 of the roller. Typically the angle 46 is adjusted to establish the correct flow of both wire and ribbon. The wire 40 is fed from a spool onto the mandrel 42, and the mandrel 42 is designed such that each individual roller 44 is mounted thereon at a particular angle 46, to provide a flow effect which enables the tape 36 (FIG. 4) to be fed onto the mandrel 42 and to be taken off in a helical form. Thus, the wire feed becomes a spiral form for the length of the duct 30 being drawn off the mandrel 42 in an automatic fashion.

Figure 4:
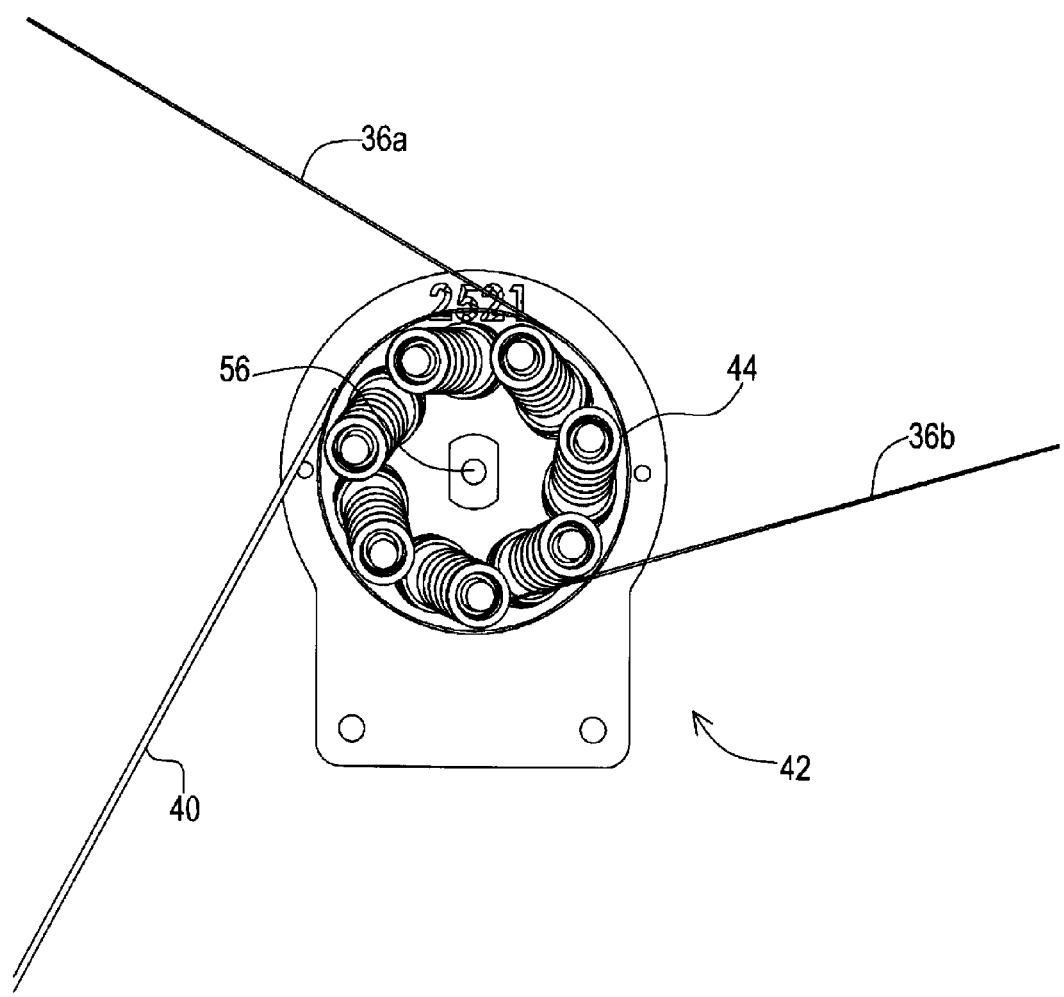
FIG. 4 shows a front view of the mandrel of FIG. 3, being fed by wire and aluminum foil tape used in the manufacturing process.
Figure 5:
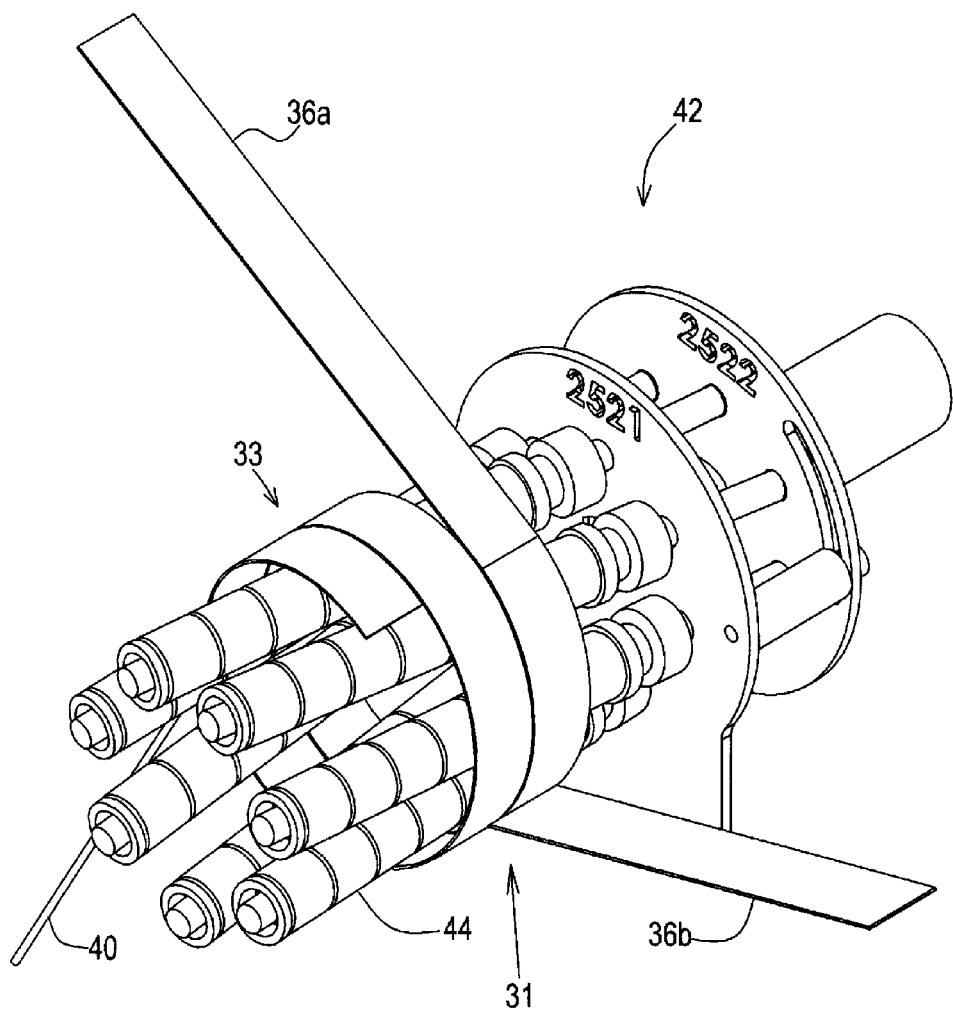
FIG. 5 shows a perspective view of the mandrel of FIG. 3 during the manufacturing process.

Referring now to FIGS. 4-5, there are shown, respectively, a front view and perspective view of mandrel 42 in the midst of the process of fabricating a duct 30. The size of the duct 30 being fabricated is determined by mandrel 42 which is rotated about its longitudinal axis 56. Inner single-layer aluminum tape 36b is helically wound with a predetermined overlap 33 around mandrel 42 as it turns to produce the single-layer inner sleeve 35 of duct 30 as a first step in forming duct 30. Galvanized wire 40 is helically wound around the single-layer inner sleeve 35 of duct 30 as mandrel 42 turns with the single-layer inner sleeve 35 formed thereupon. Outer single-layer aluminum tape 36b is helically wound with a predetermined overlap 31 around the inner sleeve 35 of duct 30 with galvanized wire 40 wound thereabout as mandrel 42 turns with the single-layer inner sleeve 35 and the wire 40 wound thereupon to produce the single-layer outer sleeve 37 of duct 30.

Figure 6:
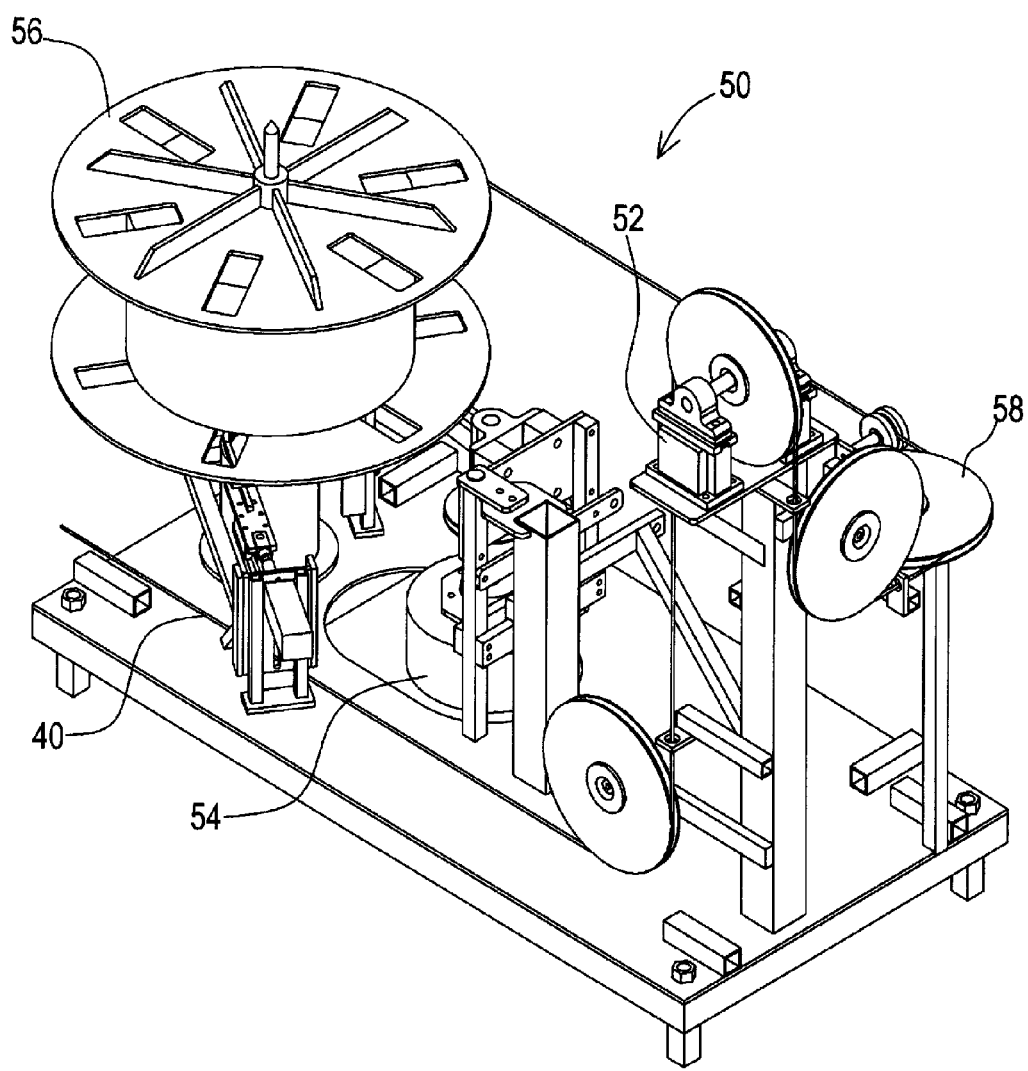
FIG. 6 shows a wire-feed system for tension control of the wire fed to the mandrel.

Referring now to FIG. 6, a wire-feed system 50 for tension control of the wire 40 fed to the mandrel 42 is shown. The tensioning of the wire 40 is provided by equipment placed on the automatic wire-feed system 50 which incorporates a load cell 52 that controls an electronic brake 54 which controls the flow of wire 40 onto the mandrel 42, supplied by the wire feed supply spool 56. The equipment for tensioning also includes a plurality of tension pulleys 58.

Figure 7:
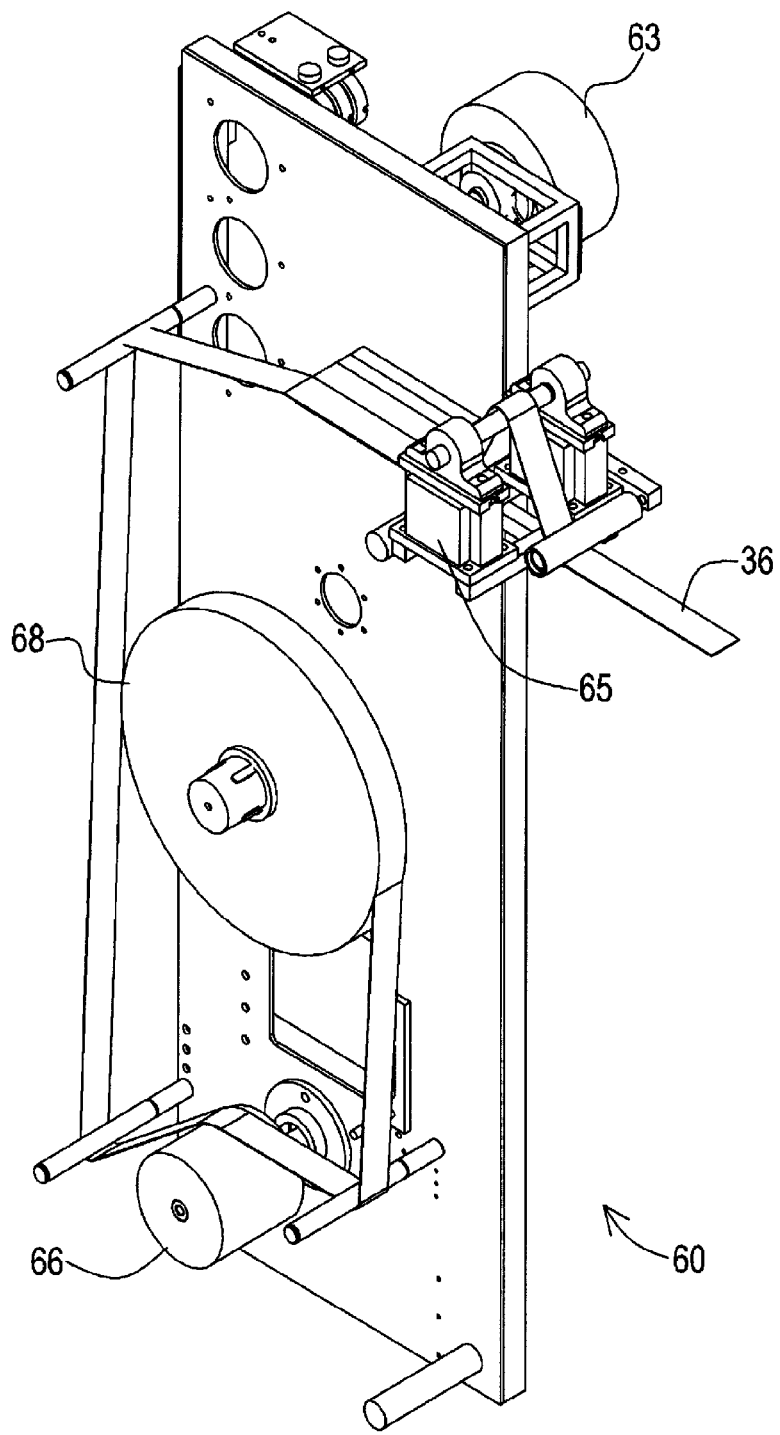
FIG. 7 shows an aluminum tape-feed system for tension control of the tape fed to the mandrel.

Referring now to FIG. 7, there is shown an aluminum tape-feed system 60 for tension control of the tape 36 fed to the mandrel 42. A load cell 65 and electronic brake 63, are provided to control rotation of the spool 68 of aluminum tape 36, thereby providing it with tension. With the correct control of the spool 68 rotation, to provide a constant tape tension, a proper feed and feed rate are achieved for automatically winding the tape 36 onto the mandrel 42 which is rotated at a sufficient speed to provide an automatic flow for efficient production of the flexible duct 30. A glue applicator 66 is mounted on the system 60 as well for applying glue to the aluminum tape 36 so the two layers of tape 36 will bond to the wire 40 and to each other, when creating the duct 30.

The tension of the two aluminum ribbons 36a, 36b must be identical and constant at all times, otherwise the ribbon will tear. Also, the tension of the wire 40 must be constant and equal to the tension of the two aluminum ribbons 36a, 36b. The tension typically required for fabricating a duct 30 ranges between 65 kgf-70 kgf. The rollers 44 of the mandrel 42 are mounted to plate 43, and are designed so as to provide a flexible spring-like action which absorbs any irregularities in the tension settings or any irregularities associated with the tape and wire materials being used.

Figure 8:
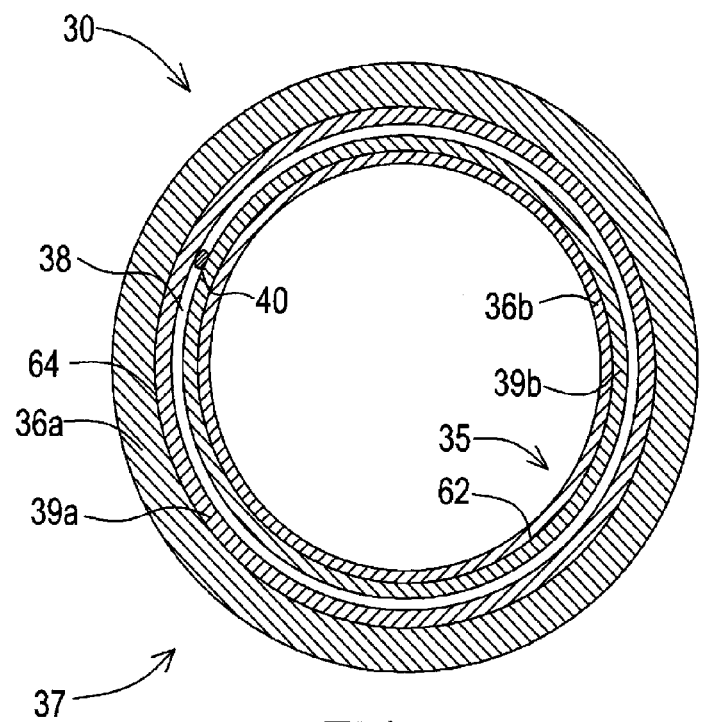
FIG. 8 is a schematic, dimensionally exaggerated cross-sectional view of a second embodiment of the duct of FIG. 1.

Referring now to FIG. 8 there is shown a schematic, dimensionally exaggerated cross-sectional view of a second embodiment of the duct 30 of FIG. 1. Duct 30 has inner and outer sleeves, referenced 35 and 37, respectively, which are coaxial and are of a laminate construction, each preferably being formed of a wound helical wrapping of a two-layer laminated tape formed of two layers of ribbon, 36b, 39b, and 36a, 39a, respectively, bonded together with adhesive layers 62, 64. Inner sleeve 35 has an internal layer of aluminum ribbon 36b and an external layer of polyester ribbon 39b bonded together with adhesive layer 62 to form a two-layer laminated tape which is helically wound around a mandrel (42, see FIG. 13, discussed hereinbelow) to form inner sleeve 35. Coaxially wound around inner sleeve 35 is a wound helical wire 40, preferably of galvanized wire, disposed between inner sleeve 35 and outer sleeve 37 encapsulated within adhesive layer 38. Outer sleeve 37 is fabricated in a manner similar to inner sleeve 35, but wherein, the helically wound two-layer laminated tape has an internal layer of polyester ribbon 39a and an external layer of aluminum ribbon 36a, bonded together with adhesive layer 64. The wound galvanized wire 40 imparts corresponding corrugations 34 to duct 30, as can be seen in FIG. 1.

Polyester ribbon layers 39b and 39a are both heat resistant and fire retardant and further are made thick enough to contribute to the rigidity and structural integrity of duct 30 together with aluminum ribbon layers 36b and 36a, which, being metallic, are fireproof as well. The adhesive employed in adhesive layers 62, 38, and 64 is also heat resistant and fire retardant. It should be noted that polyester ribbon layers 39b and 39a are also puncture resistant, which is a further advantage of the duct 30 of the present invention.

Duct 30 is manufactured fully extended by a continuous process, further described hereinbelow, and is then cut to a desired length. The corrugations 34 imparted thereto by wound helical wire 40 allow duct 30 to be axially compressed into a compact configuration convenient for storage or shipping. When duct 30 is compressed, as shown in FIG. 3, aluminum layers 36b and 36a and polyester layers 39b and 39a naturally fold between the ridges (referenced 34 in FIG. 1) created by wound helical wire 40. For example, a 2.4 meter length of 10 centimeter diameter duct fabricated in accordance with the present invention can be compressed to a length of approximately 15 centimeters, which is comparable to the compression of simple prior art ducts described hereinabove that do not have the advantages and improvements of the present invention.

A particular advantage of the unique, multilayered construction of the present invention is that duct 30 maintains its rigidity and structural integrity and functions like a totally rigid duct even after having been compressed to its compact configuration and re-extended to its original length.

Figure 9:
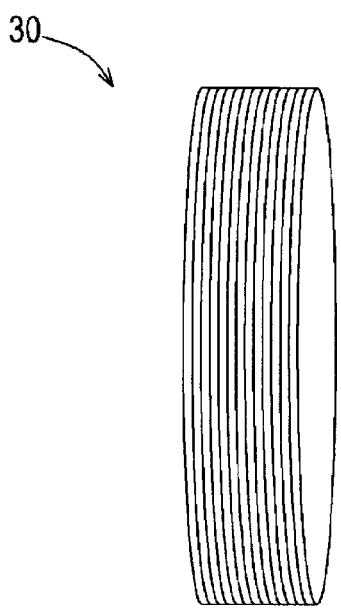
FIG. 9 is a schematic oblique view of a segment of a duct that has been compressed.

Referring now to FIG. 9, there is shown a compressed segment of the duct 30. The ability to compress the duct after it has been manufactured is advantageous for purposes of storing and shipping. Furthermore, the duct 30 retains its shape after compression so once it is extended it returns to its original duct shape, retaining its substantial rigidity.

Figure 10:
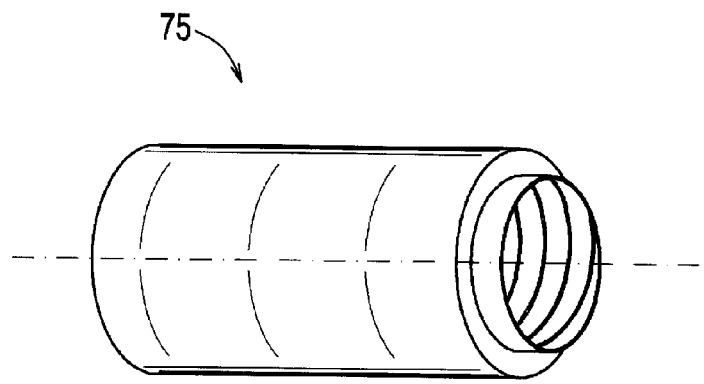
FIG. 10 is a schematic oblique view of a duct similar to that shown in FIG. 1, further including an insulating sheath, constructed and operative in accordance with a further embodiment of the present invention.

Referring now to FIG. 10, there is shown a schematic oblique view of a segment of a duct, referred to generally as 75. A schematic axial cross-sectional view of duct 75 is shown in FIG. 11.

Figure 11:
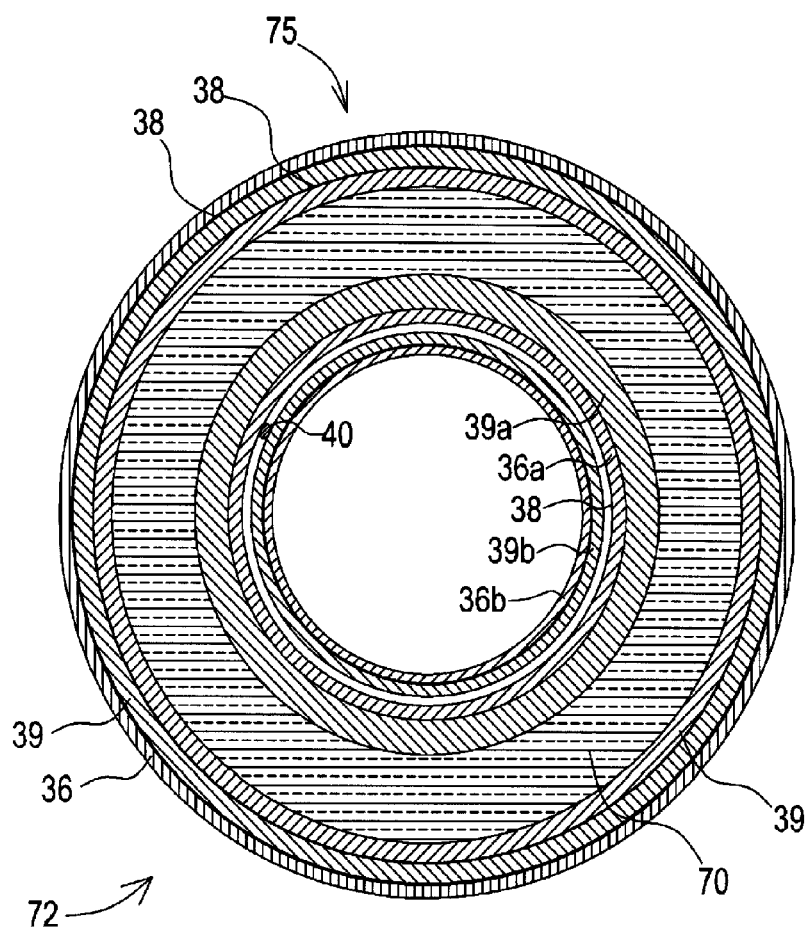
FIG. 11 is a schematic, dimensionally exaggerated cross-sectional view of the duct of FIG. 10.

Referring now to FIG. 11, duct 75 is similar to that shown in FIG. 1, but also includes an insulating layer 70 disposed parallel to and about outer sleeve 37 constructed and operative in accordance with a further preferred embodiment of the present invention. Additionally, insulating layer 70 has an enclosing jacket serving as a vapor barrier, referred to generally as 72, and disposed thereabout. Insulating layer 70 is typically fabricated of fiberglass, which provides the desired insulation and is fire resistant. Enclosing jacket 72 is formed of an inner helical winding of polyester ribbon 39, bonded with a layer of heat and fire retardant adhesive 38 and an outer helical winding of a two-layer laminated tape having an inner layer of polyester ribbon 39 and an outer layer of aluminum ribbon 36 bonded together by a heat resistant and fire retardant adhesive 38.

In a preferred embodiment of the present invention, insulating layer 70 and enclosing jacket 72 of duct 75 have the following dimensions. Depending on the application, insulating layer 70 typically may be either 25 or 50 millimeters in thickness. The wrapping of polyester ribbon 39 is 12 microns thick. The two-layer laminated tape of the outer helical winding has an inner polyester ribbon layer 39 that is 12 microns thick and an outer aluminum ribbon layer 36 that is 7 microns thick, so that, with the adhesive 38, outer helical winding has a thickness of 21 microns. It should be noted that the above-mentioned dimensions are typical and are exemplary of a preferred embodiment of the present invention, and that the present invention is not limited thereto.

Enclosing jacket 72 is manufactured by a continuous process, similar to that used for manufacturing duct 30, and is then cut to a desired length. Duct 75 is assembled from an insulating layer 70 cut to the desired length and an enclosing jacket 72 cut to the desired length, which are drawn onto a segment of uninsulated duct, similar to duct 30, cut to the desired length.

Figure 12:
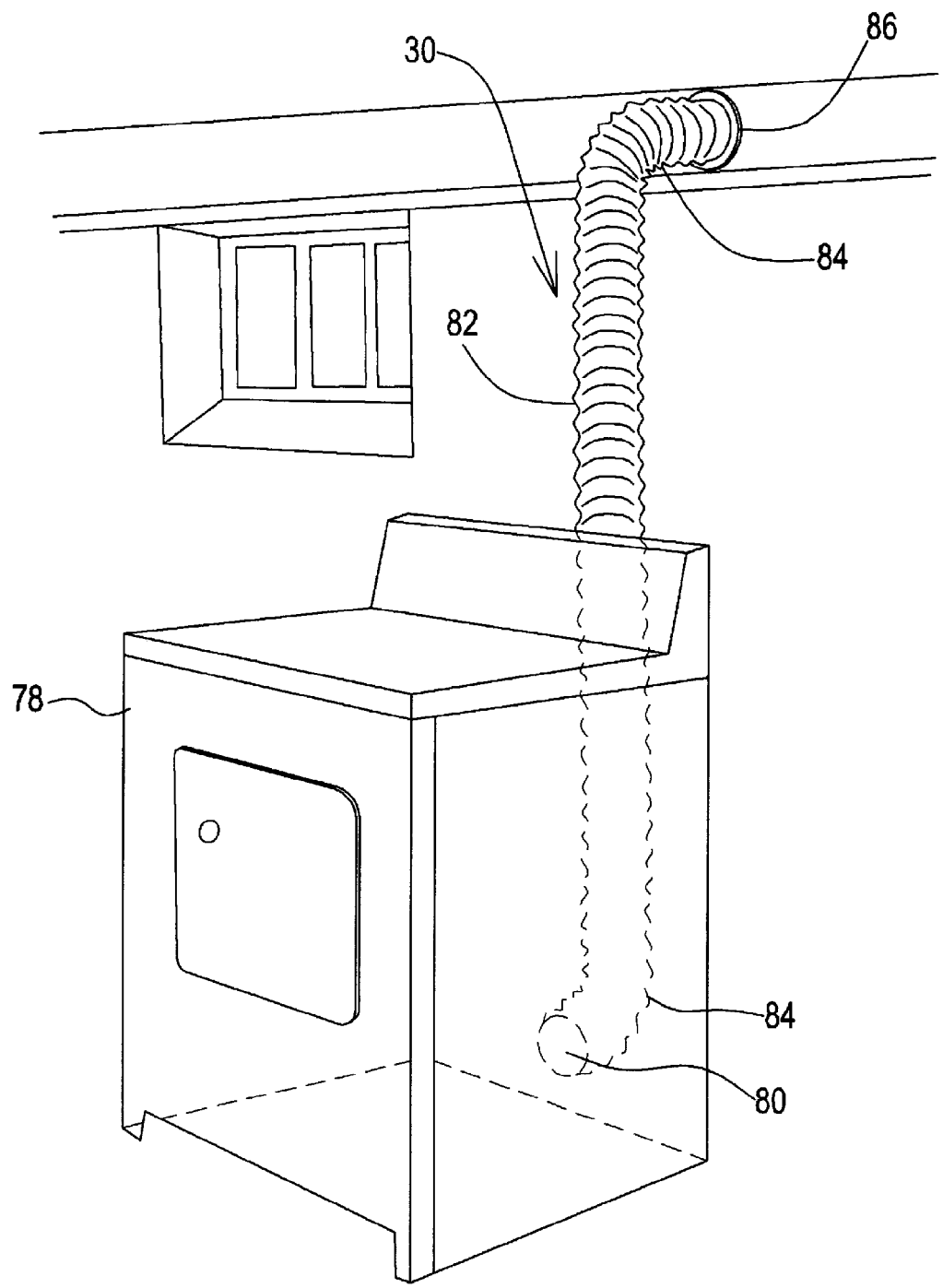
FIG. 12 is a schematic view of a duct, constructed and operative in accordance with an embodiment of the present invention, which is installed as an exhaust transition duct of a clothes dryer.

Referring now to FIG. 12, there is shown a schematic view of a duct 30, constructed and operative in accordance with an embodiment of the present invention, installed as an exhaust transition duct of a clothes dryer 78. Duct 30 is connected to dryer exhaust port 80 and has a vertical segment 82 and two right angle bends 84 connecting it to an outside exhaust port 86, thereby allowing it to vent the exhaust gases of clothes dryer 78. The features of the present invention discussed hereinabove, notably the rigidity and structural integrity and the reduced tendency to accumulate lint are particularly advantageous in applications such as this.

The advantageous properties of the duct of the present invention result both from its unique construction described hereinabove and from the method of manufacture thereof.

Figure 13:
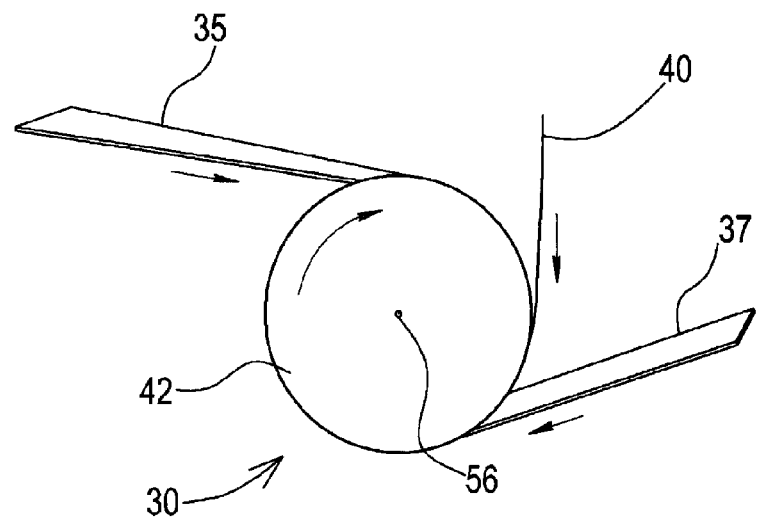
FIG. 13 is a schematic axial view of a duct such as that of FIG. 1 being fabricated according to the method of the present invention.

Referring now to FIG. 13, there is shown a schematic axial view of a duct, referred to generally as 30, in accordance with the present invention being fabricated according to the method of the present invention. The size of the duct 30 being fabricated is determined by mandrel 42 which is rotated about its longitudinal axis 56. Inner two-layer laminate tape 35 is helically wound with a predetermined overlap 88 (FIG. 14) around mandrel 42 as it turns to produce the two-layer inner sleeve of duct 30 as a first step in forming duct 30. Galvanized wire 40 is helically wound around the two-layer inner sleeve of duct 30 as mandrel 42 turns with the two-layer inner sleeve formed thereupon. Outer two-layer laminate tape 37 is helically wound with a predetermined overlap 90 (FIG. 14) around the two-layer inner sleeve of duct 30 with galvanized wire 40 wound thereabout as mandrel 42 turns with the two-layer inner sleeve and the wire wound thereupon to produce the two-layer outer sleeve of duct 30.

Figure 14:
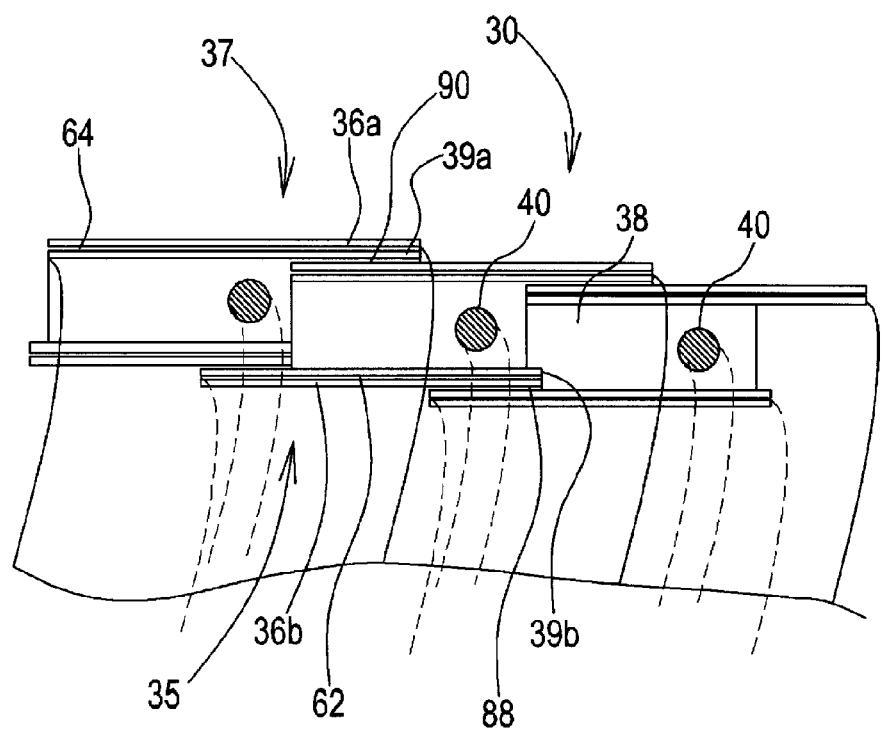
FIG. 14 is an enlarged detailed, schematic, dimensionally exaggerated, cross-sectional view of a portion of the wall of a duct such as that of FIG. 1.

Referring now to FIG. 14, there is shown an enlarged detailed schematic cross-sectional view of a portion of the wall of a duct, referred to generally as 30, constructed in accordance with the present invention, being fabricated according to the method of the present invention. Inner two-layer laminate tape, referred to generally as 35, is formed by combining an aluminum ribbon 36b with a polyester ribbon 39b by applying a fire-retardant adhesive 62 therebetween to bond them together. Similarly, outer two-layer laminate tape, referred to generally as 37, is formed by combining a polyester ribbon 39a with an aluminum ribbon 36a by applying a fire-retardant adhesive 64 therebetween to bond them together. It should be noted that inner two-layer laminate tape 35 and outer two-layer laminate tape 37 are both prepared prior to their being helically wound around mandrel 42 (FIG. 13) to fabricate duct 30, and that inner two-layer laminate tape 35 is wrapped around the mandrel 42 with the aluminum ribbon 36b side inward toward the mandrel 42 and outer two-layer laminate tape 37 is wrapped around the mandrel 42 with the polyester ribbon 39a side inward toward the mandrel 42. It should further be noted that inner two-layer laminate tape 35 and outer two-layer laminate tape 37 are each respectively helically wound with a predetermined partial overlap, 88 and 90 respectively, so that successive wrappings produce continuous inner and outer two-layer sleeves. Additionally, it should be noted that the wires of wire winding 40 are aligned approximately centered above the overlap 88 in inner two-layer laminate tape 35, and the overlap 90 in outer two-layer laminate tape 37 is aligned approximately centered above the spaces between the wires of wire winding 40, which has been found to enhance the strength and rigidity of duct 30. Prior to inner two-layer laminate tape 35 and outer two-layer laminate tape 37 being helically wound around the mandrel to fabricate duct 30, the outer, polyester ribbon 39b side of inner two-layer laminate tape 35 and the inner, polyester ribbon 39a side of outer two-layer laminate tape 37 are coated with a fire-retardant adhesive, such as with a rolling adhesive applicator 66 (FIG. 7), thereby allowing them to be bonded together with an adhesive layer 38 which also encapsulates galvanized wire winding 40 therebetween, when all are wound around mandrel 42 (FIG. 13) so as to fabricate duct 30.

Returning now to FIG. 13, it can be seen that both inner two-layer laminate tape 35 and outer two-layer laminate tape 37, as well as galvanized wire 40, are all continuously and simultaneously wrapped and wound, respectively, around mandrel 42 as it rotates. The wrappings and the winding, while occurring simultaneously, are performed with predetermined phase differences, with respect to the rotation of mandrel 42, between them. Thus, duct 30 is fabricated in one continuous operation. In an exemplary preferred embodiment of the present invention, the phase difference between the wrapping of inner two-layer laminate tape 35 and the winding of galvanized wire 40 is 360 degrees or one complete rotation of mandrel 42, and the phase difference between the winding of galvanized wire 40 and the wrapping of outer two-layer laminate tape 37 is 120 degrees or one third of a complete rotation of mandrel 42 about axis 56.

For the insulated duct 75 of FIGS. 10 and 11, enclosing jacket 72 is fabricated by a process analogous to that used to fabricate duct 30 described hereinabove.

Figure 15:
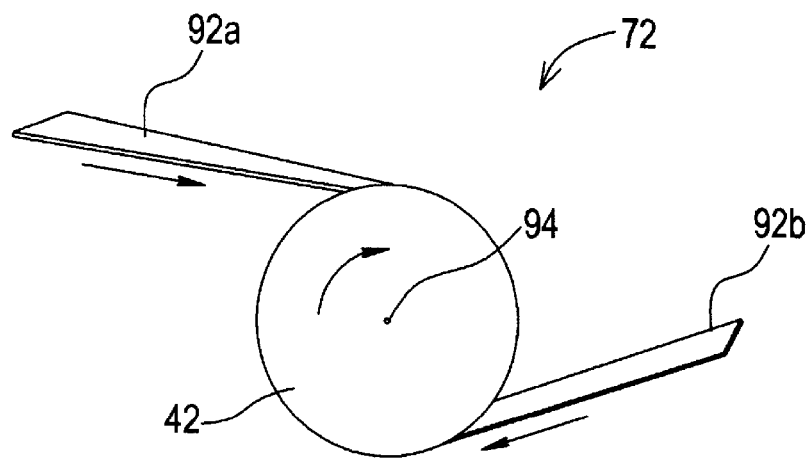
FIG. 15 is a schematic axial view of an enclosing jacket such as that of FIG. 11 being fabricated according to the method of the present invention.

Referring now to FIG. 15, there is shown a schematic axial view of an enclosing jacket, referred to generally as 72, in accordance with the present invention being fabricated according to the method of the present invention. A two-layer laminate tape 92 with an inner polyester ribbon layer and an outer aluminum ribbon layer bonded with a fire-retardant adhesive is formed. A continuous inner plastic sleeve 92a is produced by helically winding a polyester ribbon 39 around a rotating mandrel 42 of the desired diameter, and a continuous outer two-layer sleeve 92b is produced by helically winding the two-layer laminate tape 92 around the inner plastic sleeve 92a as the mandrel rotates, with a fire-retardant adhesive layer applied therebetween. Further as described hereinabove, enclosing jacket 72 is produced in one continuous operation, with continuous inner plastic sleeve 92a and outer two-layer sleeve 92b both wrapped around mandrel 42 continuously and simultaneously, with only a specific phase difference, with respect to the rotation of mandrel 42, between them. In a preferred embodiment of the present invention, the phase difference between the wrapping of the inner plastic sleeve 92a and that of the outer two-layer sleeve 92b is 360 degrees or one complete rotation of mandrel 42 about axis 94. In additional embodiments of the present invention, an additional tape of open-mesh laid fiberglass scrim may be wrapped between polyester ribbon 39 and two-layer laminate tape 92 in enclosing jacket 72 (not shown).

To produce insulated duct 75 (FIGS. 10 and 11), a piece of continuously produced uninsulated duct 30 (FIG. 13) is cut to the desired length, and a piece of continuously produced enclosing jacket 72 (FIG. 11) is cut to the desired length. As shown schematically in FIG. 18, the desired length piece of enclosing jacket 72, together with an insulating fiberglass sheath 70 of the desired length and suitable inner and outer diameters, are drawn over the desired length piece of uninsulated duct 30 to produce the insulated duct 75 shown in FIGS. 10 and 11.

Figure 16:
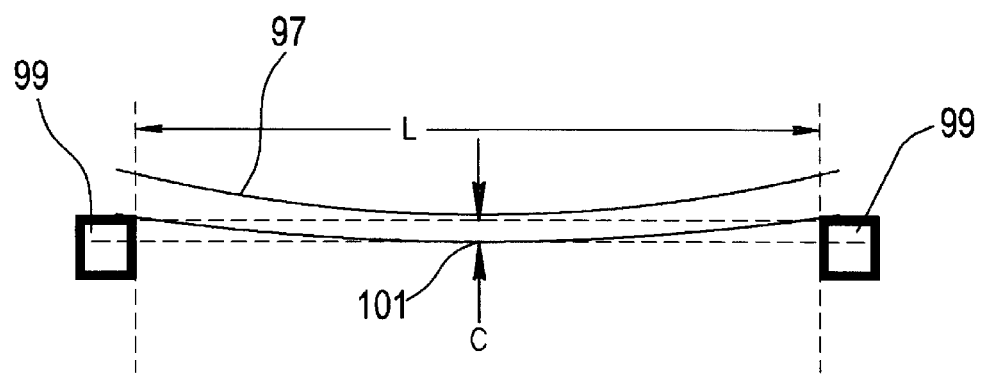
FIG. 16 is a schematic representation of the vertical sag of the unsupported center of a segment of duct such as that of FIG. 1 supported at its ends.

Referring now to FIG. 16, there is shown, schematically, the vertical sag c of the unsupported center 101 of a horizontal segment of duct 200 spanning between two supports 215 a distance L apart. For example, for a length of duct that has been returned to its extended configuration after having been compressed, a 1.5 meter horizontal span of 10 centimeter diameter duct with no support in its center will substantially maintain its rigid shape and sag in the unsupported center by no more than 1 centimeter, while a similar 2 meter horizontal span of 10 centimeter diameter duct will sag in the unsupported center by no more than 5 centimeters. For a length of duct 30 that has not been compressed, a 1.5 meter horizontal span of 10 centimeter diameter duct that has no support in its center will maintain its rigid shape with negligible sag, while a 2 meter horizontal span of 10 centimeter diameter duct will sag in the unsupported center by no more than 1 centimeter.

Figure 17:
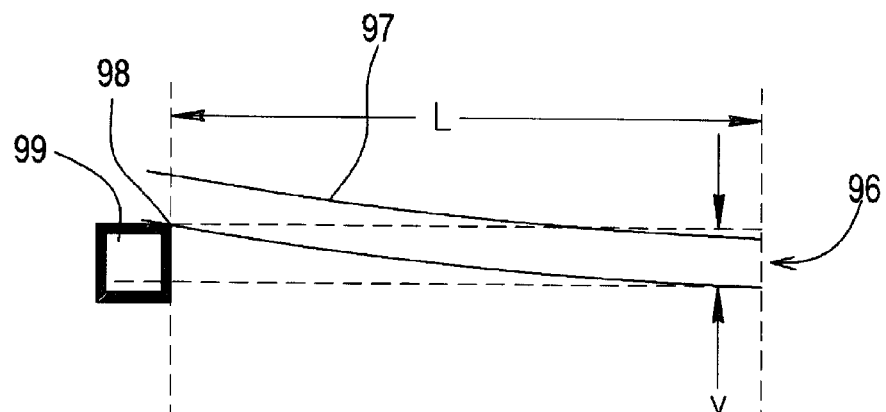
FIG. 17 is a schematic representation of the vertical displacement from the horizontal of the unsupported end of a segment of duct such as that of FIG. 1 supported at its other end.

Referring now to FIG. 17, there is shown, schematically, the vertical displacement y from the horizontal of one unsupported end 96 of a horizontal segment of duct 97 of length L, as a result of bending due to gravity, when the other end 98 has support 99. Similarly, a vertically deployed segment of the duct of the present invention will maintain its rigidity, and not sag or collapse, even when returned to its extended configuration after having been compressed. As will be clear to those familiar with the art, these features represent a major improvement over the prior art, including solid aluminum corrugated tubes such as those employed in the invention of the Whitney patent (U.S. Pat. No. 5,281,187) discussed hereinabove.

Another advantage of the unique multilayered construction of the present invention is that when it is fully extended after compression, the inward-facing surface of the aluminum layer 36b of the inner sleeve 35 is substantially smooth and featureless except for the helical corrugations imparted by wire winding 40. This reduces frictional resistance to air flow within the duct, and, for clothes dryer exhaust transition ducts, significantly impedes the accumulation of lint inside the duct, thereby greatly reducing the fire hazard cited hereinabove with respect to the prior art.

Referring again to FIG. 8, in a preferred embodiment of the present invention in a typical product of the invention, duct 30 may have the following exemplary dimensions. The two-layer laminated tape of inner sleeve 35 has an inner aluminum ribbon layer 36b that is 7 microns thick and a polyester ribbon layer 39b that is 12 microns thick, so that, with the adhesive 62, inner sleeve 35 has a thickness of 21 microns. The wire helix 40 is a 0.9 mm diameter galvanized wire. The two-layer laminated tape of outer sleeve 37 has an outer aluminum ribbon layer 36a that is 25 microns thick and a polyester ribbon layer 39a that is 12 microns thick, so that, with the adhesive 280, outer sleeve 37 has a thickness of 39 microns. The use of the thinner (7 microns) aluminum ribbon layer 36b in inner sleeve 35 contributes to the above-mentioned smoothness of with the adhesive 280, outer sleeve 37 has a thickness of 39 microns. The use of the thinner (7 microns) aluminum ribbon layer 36b in inner sleeve 35 contributes to the above-mentioned smoothness of the inner surface of duct 30. It should be noted that the above-mentioned dimensions are typical and are exemplary of a preferred embodiment of the present invention, and that the present invention is not limited thereto. It should further be noted that, with suitable dimensions for the other layers of the duct of the present invention, either polyester layer 39b of inner sleeve 35 or polyester layer 39a of outer sleeve 37 may be omitted without loss of the improvements in rigidity of the present invention, albeit at a cost of additional thickness of aluminum, resulting in additional weight and expense. As such, either of these alternative configurations should be considered as being included in the present invention, as well as alternative dimensions of the layers that can still provide the desired performance of duct 30. Similarly, metallic layers or plastic layers fabricated of materials having properties comparable to those of the aluminum and polyester layers described hereinabove should also be considered as being included in the present invention.

Figure 18:
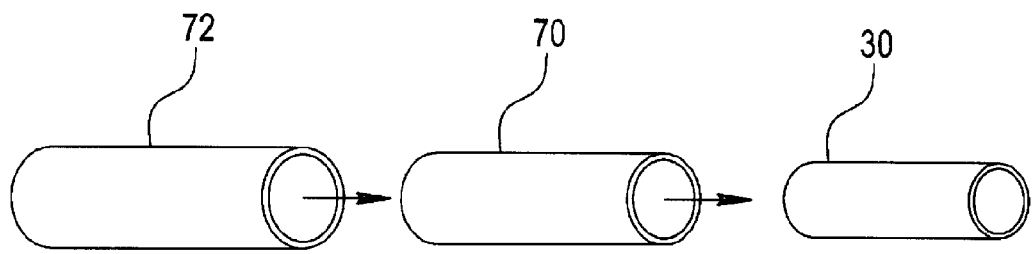
FIG. 18 is a schematic representation of the fabrication of an insulated duct such as that of FIG. 11.

Referring now to FIG. 18, there is shown is a schematic representation of the fabrication of an insulated duct, fabricated from the three following layers which have been described hereinabove: 1. Internal layer of duct 30; 2. intermediate layer which is insulating layer 70, and 3. Outer layer which is enclosing jacket 72.

Referring now to FIGS. 19A-21C, there are provided ducts which are generally similar to those shown and described above in conjunction with FIGS. 1, 8-17, and which have similar characteristics of strength, durability, puncture resistance and fire resistance, and thus are not specifically described again herein, save with reference to the differences between the ducts previously illustrated and those described hereinbelow.

Figure 19A:
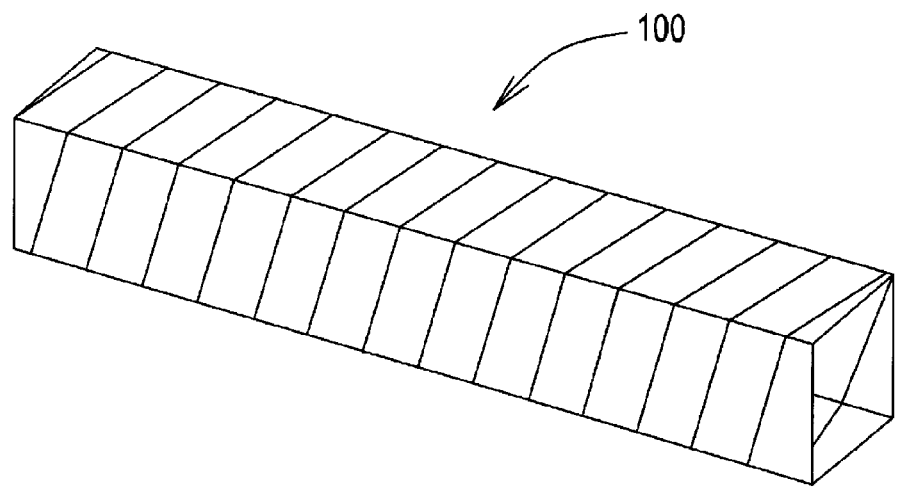
FIG. 19A is a side view of a portion of a duct having a square cross-sectional configuration, constructed and operative in accordance with a further embodiment of the present invention.
Figure 19B:
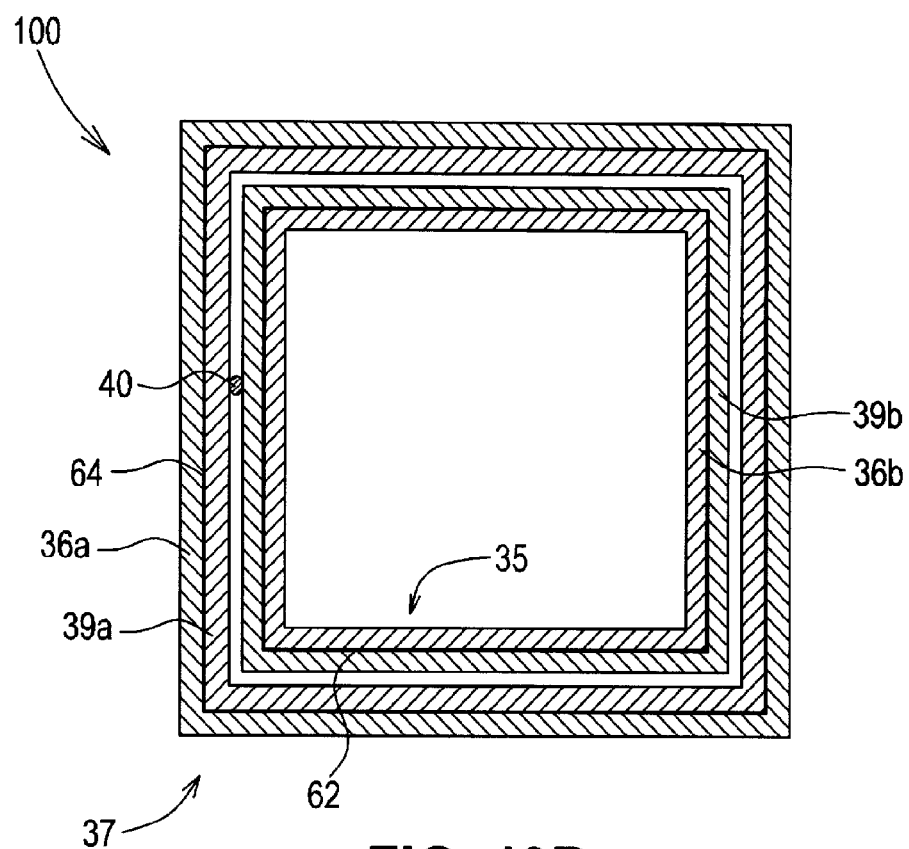
FIG. 19B is a schematic dimensionally exaggerated cross-sectional view of the duct of FIG. 19A.

Referring now initially to FIGS. 19A-19B, duct 100 is a non-insulated polygonal duct, generally similar to that shown and described hereinabove in conjunction with FIGS. 1 and 8. Typically, it may be a square section duct used for gas transport, such as for ventilation, cooling, and heating systems, or for an exhaust system, as illustrated in FIG. 21A at 120.

Figure 20A:
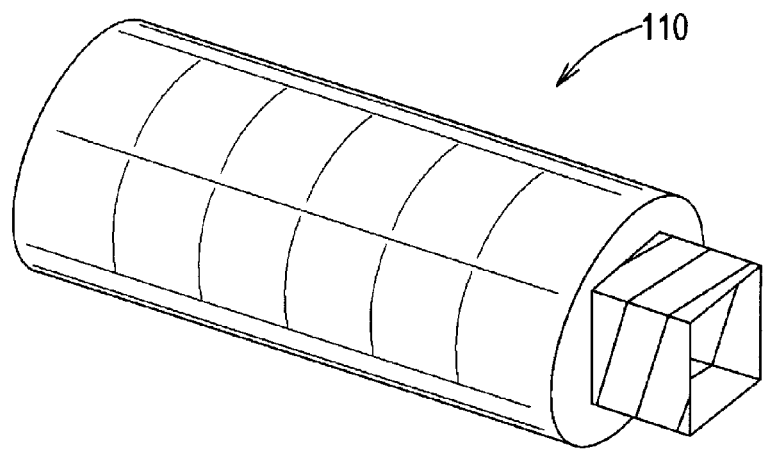
FIG. 20A is a schematic oblique view of a duct similar to that shown in FIG. 19A, but having an insulating sheath, constructed and operative in accordance with yet a further embodiment of the present invention.
Figure 20B:
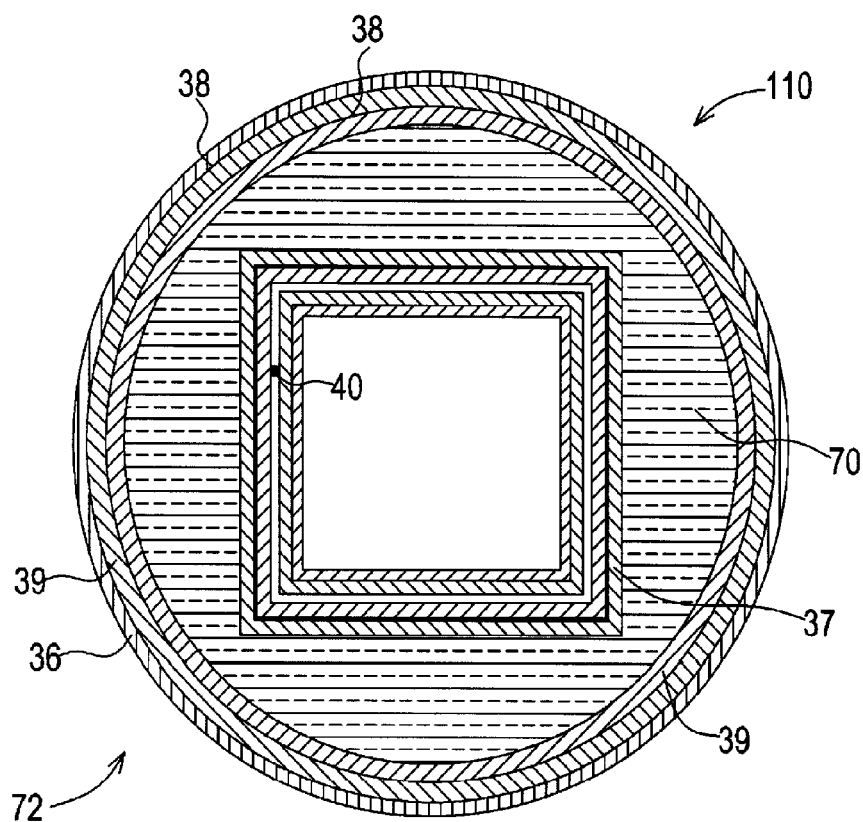
FIG. 20B is a schematic dimensionally exaggerated cross-sectional view of the duct of FIG. 20A.

Referring now to FIGS. 20A-20B, duct 110 is an insulated polygonal duct, generally similar to that shown and described hereinabove in conjunction with FIGS. 10-11. Typically, and as seen in FIG. 21B, it may be a rectangular section duct 120', used for utility lines 122, such as electricity communications, gas, or water.

Figure 21C:
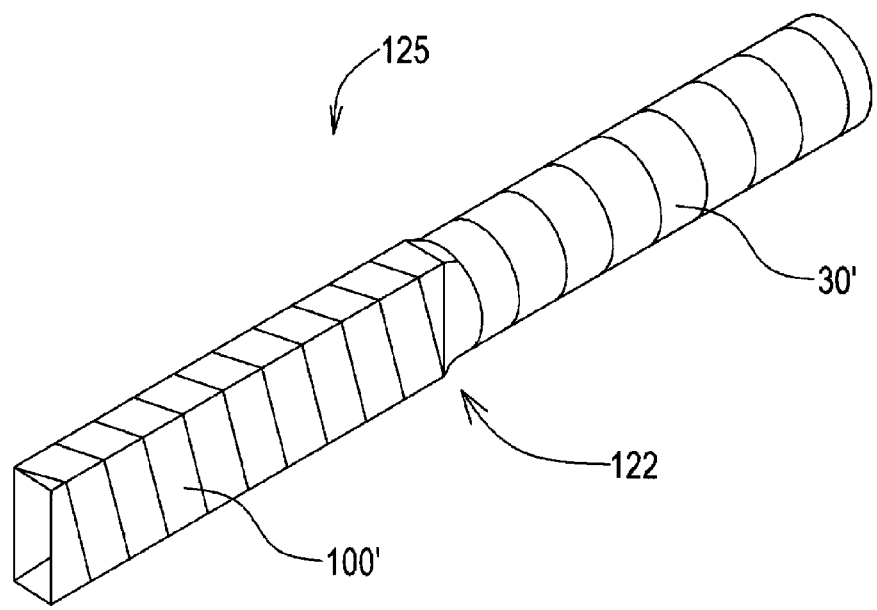
FIG. 21C is a pictorial representation of a compound duct.

Referring now to FIG. 21C there is seen a portion of a compound duct 125 which has both a cylindrical portion, referenced 30', substantially as shown and described above in conjunction with FIGS. 1, 8-9; and a square or rectangular portion, referenced 100', substantially as shown and described above in conjunction with FIGS. 19A-19B. The two differently shaped portions are connected via a transition portion 122. Typically, compound duct 125 is primarily cylindrical, and has a rectangular end portion so as to facilitate connection of the duct to the outlet ports of different types of gas emitting machines, wherein the outlet ports are square or rectangular. Use of the illustrated duct clearly avoids the necessity of unorthodox and sometimes unsafe connections, in order to connect a square or rectangular machine outlet to a cylindrical duct. The compound duct 125 may be formed as described below in conjunction with FIGS. 23A-23C, or by any other suitable method.

Figure 22:
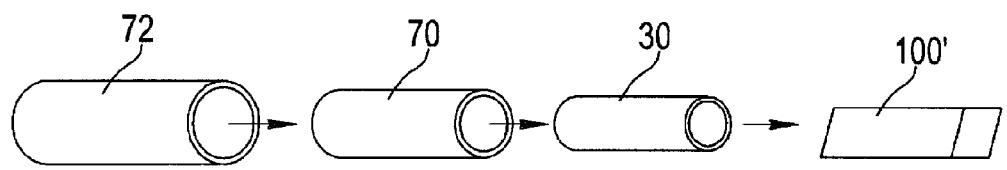
FIG. 22 is a schematic representation of the fabrication of the insulated polygonal duct illustrated in FIGS. 20A and 20B.

Referring now to FIGS. 22-23C, the polygonal ducts of the present embodiment may be manufactured in substantially the same manner as shown and described hereinabove in conjunction with FIGS. 13, 14, and 18, as may be observed from the first three steps of the flow chart of FIG. 22, which are identical to those described hereinabove in conjunction with FIG. 18. In the present embodiment however, the cylindrical duct which results from the hitherto described method of manufacture, is converted, either wholly or partially, into a polygonal duct, preferably square or rectangular, as shown at 100' in FIG. 22.

Referring now to FIGS. 23A-23C, conversion of a length of cylindrical duct 30 may be achieved by mounting a length thereof onto an expanding metal profile 126, having an external shape adapted to expand to the shape and size desired. Once the duct 30 is mounted onto profile 126, the profile is operated as known in the art, so as to expand against the interior surface of the round duct, thereby to deform it into a predetermined shape. As seen in the drawings, it may also be desired to complement the outward deformation forces applied from the interior of the duct by the expanding metal profile 126, by external deformation forces, such as may be provided by trolley 128. Trolley 128 comprises a chassis 130, onto which are mounted a plurality of cylindrical wheels 132 which, as seen in FIG. 23C, define, together with wheels 132, internal right-angled profiles 134. As trolley 128 travels along the profile 126 and then engages duct 30, the duct is stretched both from the interior by profile 126, and is also squeezed between the profile 126 and the inward-facing right-angled profiles of trolley 128, thereby to impart to the duct a desired polygonal shape. In the present example, this shape is rectangular, but this is by way of example only, as it could be any desired shape, whether rectangular, or any other type of polygon. In accordance with an alternative embodiment of the invention, there may be provided an additional trolley in order to properly form the bottom corners of the polygonal duct.

Clearly, also in accordance with the present invention, and referring also to FIG. 21C, in the event that a cylindrical duct is to remain cylindrical but with a square or rectangular end only, such as for connection purposes to the outlet of a gas emitting machine, this will be done by mounting only that portion of the duct desired to be transformed, onto the expanding profile, thereby to obtain a rectangular or square portion, referenced 100' in FIG. 21C.

It will further be appreciated by persons skilled in the art that the scope of the present invention is not limited by what has been specifically shown and described hereinabove, merely by way of example. Rather, the scope of the present invention is defined solely by the claims, which follow.

The invention claimed is:

1. A semi-rigid, flexible air duct having an axis running the length of said duct and having an inner and outer surface, comprising:
   a pair of coaxial sleeves, including an inner sleeve and an outer sleeve disposed parallel to and about said inner sleeve; and
   a resilient wound element disposed between said inner sleeve and said outer sleeve,
   wherein each of said inner sleeve and said outer sleeve constitutes an aluminum foil ribbon layer,
   a second, plastic layer bonded to said first foil layer of at least one of said inner sleeve and said outer sleeve, wherein said second plastic layer of said two-layer laminate is bonded to said first layer thereof with a fire-retardant adhesive,
   wherein each of said sleeves has metallic properties,
   wherein said wound element imparts corrugations to said inner sleeve and said outer sleeve, such that said duct is axially extendible between a compacted configuration suitable for storage and for shipping and an extended configuration suitable for installation in an air transport arrangement;
   and wherein said layers of both said inner sleeve and said outer sleeve are of a predetermined thickness rendering said duct substantially rigid when in said extended configuration and enabling said duct to maintain its substantial rigidity upon extension from said compacted configuration and wherein said inner sleeve having an inward-facing surface being substantially smooth and featureless except for said wound corrugations so that there is a reduction in the tendency to accumulate lint, thereby improving airflow and reducing fire hazards.

2. The duct of claim 1, wherein both said aluminum foil ribbon layer of said inner sleeve and said aluminum foil ribbon layer of said outer sleeve are of a thickness in a range of 24 to 35 microns.

3. The duct of claim 2, wherein, when L=2 meters and d=10 centimeters, c≦0.005 L, and wherein, when said duct is in said extended configuration upon extension from said compacted configuration, c≦0.025 L.

4. The duct of claim 1, wherein said duct has a cross-sectional configuration selected from the group which consists of: a circular configuration, a polygonal configuration and a compound configuration wherein said duct is partially circular and partially polygonal.

5. The duct of claim 1, wherein, when a predetermined length L of said duct, of diameter d, is in the extended configuration and is disposed horizontally and supported at a first end thereof, said duct is operative to bend under the influence of gravitational force such that a second unsupported end thereof is lower than said first supported end by no more than y, such that (y/L)×100≦p, wherein p is a predetermined percentage of L.

6. The duct of claim 1, wherein, when a predetermined length L of said duct, of diameter d, is in the extended configuration and is disposed horizontally and supported at both ends thereof, said duct is operative to bend under the influence of gravitational force such that the central portion thereof is lower than the level of said supported ends by no more than c, such that (c/L)×100≦q, wherein q is a predetermined percentage of L.

7. The duct of claim 1, wherein said inner sleeve is bonded to said outer sleeve with a fire-retardant adhesive.

8. The duct of claim 1, wherein each of said inner sleeve and said outer sleeve are fabricated of aluminum ribbon of predetermined thicknesses, and wherein said inner sleeve is an inner wound wrapping with a predetermined overlap of said inner sleeve and said outer sleeve is an outer wound wrapping with a predetermined overlap of said outer sleeve.

9. The duct of claim 1, wherein said resilient wound element is fabricated of a metal having spring-like resilience.

10. The duct of claim 9, wherein said resilient wound element is a wound galvanized wire.

11. The duct of claim 9, wherein said galvanized wire has a diameter in the range of 0.9 to 1.3 millimeters.

12. The duct of claim 1, wherein each of said inner sleeve and said outer sleeve includes a second, plastic layer bonded to said first foil layer, forming thereby, respectively, an inner two-layer laminate and an outer two-layer laminate.

13. The duct of claim 12, wherein both said inner two-layer laminate and said outer two-layer laminate are fabricated of fire-resistant materials and wherein said second, plastic layers of both said inner two-layer laminate and said outer two-layer laminate are fabricated of puncture-resistant materials.

14. The duct of claim 12, wherein said second plastic layer of both said inner two-layer laminate and said outer two-layer laminate is bonded to said first layer thereof with a fire-retardant adhesive.

15. The duct of claim 12, wherein said second plastic layer of both said inner two-layer and said outer two-layer laminate is fabricated of polyester ribbon of a thickness in the range of 10 to 14 microns, and wherein said aluminum ribbon layer of said inner sleeve is of a thickness in a range of 6 to 12 microns and said aluminum ribbon layer of said outer sleeve is fabricated of aluminum ribbon of a thickness in the range of 24 to 35 microns.

16. The duct of claim 12, wherein said resilient wound element is aligned with said inner wound wrapping so as to be approximately centered over said overlap of said inner wound wrapping of said inner two-layer laminated tape, and said outer wound wrapping of said outer two-layer laminated tape is aligned with said resilient wound element so that said overlap of said outer wound wrapping of said outer two-layer laminated tape is approximately centered over the spaces between the windings of said resilient wound element.

17. The duct of claim 12, wherein, said second plastic layer of said inner sleeve is disposed parallel to and about said first layer thereof; and said first layer of said outer sleeve is disposed parallel to and about said second plastic layer thereof.

18. The duct of claim 1, wherein said first layers of said inner two-layer laminate and said outer two-layer laminate are fabricated of aluminum ribbon of predetermined thicknesses and said second, plastic layers of said inner two-layer laminate and said outer two-layer laminate are fabricated of polyester ribbon of predetermined thicknesses, and wherein said aluminum ribbon of said inner two-layer laminate is bonded to said polyester ribbon to form an inner two-layer laminated tape of predetermined thickness, and said aluminum ribbon of said outer two-layer laminate is bonded to said polyester ribbon thereof so as to form an outer two-layer laminated tape of predetermined thickness, and wherein said inner two-layer laminate is an inner wound wrapping with a predetermined overlap of said inner two-layer laminated tape and said outer two-layer laminate is an outer wound wrapping with a predetermined overlap of said outer two-layer laminated tape.

19. The duct of claim 1, further including an insulating sheath, disposed parallel to and about said outer sleeve, and an enclosing jacket disposed parallel to and about said insulating sheath.

20. The duct of claim 19, wherein said insulating sheath is fabricated of fiberglass of a thickness in the range of 25 to 60 millimeters.

21. The duct of claim 19, wherein said enclosing jacket is a multi-layer jacket including a tubular, plastic inner wrapping and a two-layer laminate outer wrapping disposed parallel thereto and thereabout and bonded thereto, wherein said two-layer laminate outer wrapping includes a plastic inner layer and an outer layer having metallic properties, bonded together.

22. The duct of claim 21, wherein said plastic inner wrapping is fabricated of polyester ribbon of predetermined thickness and wherein said plastic inner layer of said two-layer laminate outer wrapping is fabricated of polyester ribbon of predetermined thickness and said outer layer having metallic properties of said two-layer laminate outer wrapping is fabricated of aluminum ribbon of predetermined thickness.

23. The duct of claim 21, wherein said tubular, plastic inner wrapping and said two-layer laminate outer wrapping are bonded together with a fire-retardant adhesive and wherein said polyester ribbon and said aluminum ribbon of said two-layer laminate outer wrapping are bonded together with a fire-retardant adhesive.

24. The duct of claim 21, wherein said plastic inner wrapping is fabricated of polyester ribbon of a thickness in the range of 10 to 14 microns and said plastic inner layer of said two-layer laminate outer wrapping is fabricated of polyester ribbon of a thickness in the range of 10 to 14 microns and said outer layer having metallic properties of said two-layer laminate outer wrapping is fabricated of aluminum ribbon of a thickness in the range of 6 to 9 microns.

25. The duct of claim 1, wherein said duct has a cross-sectional configuration selected from a group which consists of:
circular, polygonal, square; and rectangular configuration.

26. A method for manufacturing a semi-rigid, flexible duct, comprising the steps of:
   a) providing a mandrel of preselected diameter for fabricating a duct therearound;
   b) providing a first continuous aluminum ribbon of predetermined thickness;
   c) providing a second continuous aluminum ribbon of predetermined thickness;
   d) wrapping said first continuous ribbon with a predetermined overlap around said mandrel to form an inner sleeve;
   e) combining at least one of said first and second aluminum ribbon, with a continuous polyester ribbon of predetermined thickness to form a continuous two-layer laminated tape;
   f) winding a wire around said inner sleeve; and
   g) wrapping said second continuous ribbon with a predetermined overlap around said inner sleeve and the wire winding to form an outer sleeve disposed parallel to and about said inner sleeve, wherein said outer sleeve is bonded to said inner sleeve using a fire-retardant adhesive, thereby to form a duct.

27. The method of claim 26, wherein said step f) of winding a wire includes the sub-step of aligning said wire with the overlap of said first ribbon so that the wire is approximately centered over the overlap of said first ribbon, and wherein said step f) of wrapping said second ribbon includes the sub-step of aligning said second ribbon so that the overlap thereof is approximately centered over the spaces between the wire windings.

28. The method of claim 26 for manufacturing a semi-rigid flexible duct,
   wherein said step c) further includes combining said second continuous aluminum ribbon of predetermined thickness with a second continuous polyester ribbon of predetermined thickness to form a second continuous two-layer laminated tape.

29. The method of claim 28, wherein said step b) of combining said first aluminum ribbon with said first polyester ribbon includes the sub-step of applying a fire-retardant adhesive between said first aluminum ribbon and said first polyester ribbon to bond them together; and wherein said step c) of combining said second aluminum ribbon with said second polyester ribbon includes the sub-step of applying a fire-retardant adhesive between said second aluminum ribbon and said second polyester ribbon to bond them together.

30. The method of claim 28, wherein said step e) of winding a wire includes the sub-step of aligning the wire with the overlap of the first two-layer laminated continuous tape so that the wire is approximately centered over the overlap of the first two-layer laminated continuous tape, and wherein said step f) of wrapping the second two-layer laminated continuous tape includes the sub-step of aligning the second two-layer laminated continuous tape so that the overlap thereof is approximately centered over the spaces between the wire windings.

31. The method of claim 26, further including, after said step f) of wrapping said second aluminum ribbon, the steps of:
   g) sheathing the outer sleeve with a fiberglass insulating sheath, disposed parallel thereto and thereabout; and
   h) enveloping the insulating sheath with an enclosing jacket.

32. The method of claim 31, wherein said step h) of enveloping includes the following sub-steps:
   1) providing a mandrel of preselected diameter for fabricating the enclosing jacket therearound;
   2) combining a polyester continuous ribbon of predetermined thickness with an aluminum continuous ribbon of predetermined thickness to form a two-layer laminated continuous tape;
   3) wrapping a continuous polyester ribbon of predetermined thickness around said mandrel to form an inner plastic sleeve; and
   4) wrapping said continuous two-layer laminated tape around said inner plastic sleeve with said polyester ribbon facing inward toward said mandrel and said aluminum ribbon facing outwardly with respect to said mandrel to form an outer two-layer sleeve disposed parallel to and about said inner plastic sleeve.

33. The method of claim 32, wherein said sub-step 2) of combining includes the sub-sub-step of applying a fire-retardant adhesive between said polyester ribbon and said aluminum ribbon of said continuous two-layer laminated tape to bond them together.

34. The method of claim 32, wherein said sub-step 3) of winding a polyester ribbon includes the sub-sub-step of coating the outer face of said inner plastic sleeve with a fire-retardant adhesive to bond it to said two-layer laminated tape.

35. The method of claim 32, wherein said sub-steps 3) and 4) are performed by rotating said mandrel as said polyester ribbon and said two-layer laminated tape are respectively taken up by said mandrel, continuously and with a predetermined phase difference therebetween, with respect to the rotation of said mandrel.

36. The method of claim 32, wherein said sub-steps 3) and 4) of winding a polyester ribbon and winding the two-layer laminated tape are performed continuously and with a phase difference of 360 degrees therebetween, with respect to the rotation of said mandrel.

37. The method of claim 32, wherein in said sub-step 3) of winding a polyester ribbon, said polyester ribbon of said inner plastic sleeve is of a thickness in the range 10 to 14 microns; and wherein, in said sub-step 2) of combining, said polyester ribbon of said continuous two-layer laminated tape is of a thickness in the range 10 to 14 microns and said aluminum ribbon of said continuous two-layer laminated tape is of a thickness in the range 6 to 9 microns.

38. The method of claim 32, and further including, after said step f) of wrapping, the additional step of imparting to at least a portion of said duct, a polygonal cross-sectional configuration.

39. The method of claim 38, and wherein said additional step of imparting a polygonal cross-sectional configuration to at least a portion of said duct comprises imparting thereto a square or rectangular cross-sectional configuration.

40. The method of claim 26, wherein said step d) of winding said first aluminum ribbon, said step e) of winding the wire, and said step f) of winding said second aluminum ribbon, are performed by rotating said mandrel as said first aluminum ribbon, the wire, and said second aluminum ribbon are respectively taken up by said mandrel, continuously and with predetermined phase differences therebetween, with respect to the rotation of said mandrel.

41. The method of claim 26, wherein said step d) of winding said first aluminum ribbon and said step e) of winding the wire are performed continuously and with a first preselected phase difference therebetween, with respect to the rotation of said mandrel; and wherein said step e) of winding the wire and said step f) of winding said second aluminum ribbon are performed continuously and with a second preselected phase difference therebetween, with respect to the rotation of said mandrel.

42. The method of claim 26, wherein said first continuous aluminum ribbon and said second continuous aluminum ribbon maintain a substantially constant and identical tension, while being wrapped around said mandrel, in the range of 65-70 kgf, and wherein said wire is also maintained in the same said tension of both said aluminum ribbons.

43. The method of claim 42, wherein said mandrel comprises a plurality of rollers each mounted so as to be individually rotatable on a fixed plate at a predetermined angle, each comprising a set of precision-shaped grooves for accepting said wire, and wherein said grooves are precision-spaced apart in order to accept a predetermined flow of said wire, established by said predetermined angle of said rollers, onto said mandrel, such that said wire becomes a spiral form within said duct being drawn off said mandrel in an automatic fashion.

44. The method of claim 43 wherein each of said rollers is mounted on said plate so as to provide a flexible spring-like action which absorbs any irregularities in said tension and irregularities associated with said wire and said ribbons.

* * * * *

UNITED STATES PATENT AND TRADEMARK OFFICE
CERTIFICATE OF CORRECTION

| | | |
|---|---|---|
| PATENT NO. | : 8,439,085 B2 | Page 1 of 1 |
| APPLICATION NO. | : 12/645517 | |
| DATED | : May 14, 2013 | |
| INVENTOR(S) | : Steven Liebson, Graeme Liebson and Robert Cohen | |

It is certified that error appears in the above-identified patent and that said Letters Patent is hereby corrected as shown below:

On the title page, item "(75)" should read --(76)--.

On the title page, item (73) Assignee- no Assignee should be listed as there was no recordal of assignment.

Signed and Sealed this
Twenty-third Day of September, 2014

Michelle K. Lee
*Deputy Director of the United States Patent and Trademark Office*